Jan. 4, 1966 D. A. NEILSON ETAL 3,228,006

DATA PROCESSING SYSTEM

Filed Jan. 6, 1961 7 Sheets-Sheet 1

INVENTORS.
DAN ALLAN NEILSON
JAMES RUSSELL BENNETT
BY Christie, Parker & Hale
ATTORNEYS.

Jan. 4, 1966 D. A. NEILSON ETAL 3,228,006

DATA PROCESSING SYSTEM

Filed Jan. 6, 1961 7 Sheets-Sheet 2

Jan. 4, 1966 D. A. NEILSON ETAL 3,228,006

DATA PROCESSING SYSTEM

Filed Jan. 6, 1961 7 Sheets-Sheet 5

| FIG. 9A. | FIG. 9B. |
|---|---|

Jan. 4, 1966 D. A. NEILSON ETAL 3,228,006

DATA PROCESSING SYSTEM

Filed Jan. 6, 1961 7 Sheets-Sheet 7

United States Patent Office 3,228,006
Patented Jan. 4, 1966

3,228,006

DATA PROCESSING SYSTEM

Dan Allan Neilson, Monrovia, and James Russell Bennett, Glendora, Calif., assignors to Burroughs Corporation, Detroit, Mich., a corporation of Michigan Filed Jan. 6, 1961, Ser. No. 81,149
18 Claims. (Cl. 340—172.5)

This invention relates to digital data processing systems and, more particularly, to an improved digital data processor. This invention further relates to an improved memory and buffer for use in a data processing system.

Generally, data processing systems have been provided with a digital data processing unit which processes data at a much higher speed than lower speed peripheral input and output punched card readers, card punches and the like. In order to translate between the high rate of processing of the digital data processing units and the lower speed input-output units, one or more separate buffering units are provided. If a coincident current magnetic core buffer unit and main memory unit are used, separate magnetic core driving circuits are needed for the buffer unit and the main memory unit. Magnetic core buffer units usually have at least two separate addressing registers to keep track of the next storage location where data from peripheral units is to be stored and to keep track of the next storage location in the buffer unit where data from the main memory unit is to be stored. This is separate from the main memory addressing register. The separate driving circuits and register circuits result in a very high cost data processing system. It has also been found that there is much wasted processing time due to the buffering arrangements between the peripheral units and the main memory unit.

The buffering units themselves are usually large, expensive and store data for a large number of separate processing runs by the digital data processor. For example, where a punched card reading unit is used as a source of data, data from a large number of separate punched cards are stored in the buffer unit. The data processor then reads the data as it is needed and stores it into its own separate main memory unit, processes the data and then shifts the result back to the buffer unit. After all the data stored in the buffer unit has been processed and the processed data stored back in the buffer, the processed data is then shifted out to card punch units or other storage or display units. This arrangement requires a large number of separate runs for doing the bookkeeping and accounting entries required in, for example, a banking system.

In contrast, the present invention provides an improved storage means or memory unit for a digital data processor which incorporates buffer units as an integral part of the memory unit. The total cost of the memory unit and buffer units is greatly reduced over that of conventional main memory and buffer combinations and yet the overall speed of the data processing system for transferring data to and from peripheral data units remains the same. The main memory and buffer combination of this invention allows a low speed and inexpensive data processor to be used in a data processing system and yet, due to the increased efficiency of the main memory and buffering arrangement, the overall speed of the data processing system is substantially the same as systems using higher speed and higher cost data processing units. This becomes much more obvious when operating with lower speed punched card reading units, card punch units and the like.

Briefly, the buffer arrangement of the present invention eliminates the need of using separate addressing registers for a coincident current magnetic core buffering unit to keep track of the next address into which data is to be written or stored and from which data is to be read. This is accomplished by providing an extra storage location in the buffer in which is stored the next address of the buffer where data is to be written or is to be read out. This is far less expensive than providing separate flip-flop address registers for storing the next address since the added cost of storage space in a coincident current core memory is small compared with the cost of flip-flop registers, and the like. By a special core driving arrangement, a number of separate buffers may be added to the coincident core main memory unit merely by the addition of a single switching circuit.

All data is handled in the data processor and read and written by the memory unit in characters. Each character is composed of a fixed number of digital binary bits. Two addressing registers are provided. One of the addressing registers addresses storage locations in the memory unit where commands are stored and the other addressing register addresses storage locations which contain characters of data to be processed and memory fields where results of the processing of data are to be stored. The output of the main memory unit is connected to an intermediate storage register, into which all characters of data to and from the memory unit are stored.

The data processor uses a special command to transfer characters of data from one of the buffers to the portions of main memory where the data is stored for processing. The commands which control the operation of the data processor comprise an order character, a character which designates which of the buffers data is to be transferred from, a character designating an initial address of the buffer unit into which data will subsequently be stored and three characters corresponding to the beginning address of a data field in the main memory where the new data characters stored in the buffer unit are to be stored for processing. A buffer selector register and two buffer addressing registers are provided for addressing a particular buffer and storage locations within the addressed buffer for reading and writing characters of data. An order register is provided for storing the order character of a command and a processing unit is provided for processing data, modifying the beginning address of data fields and incrementing the next buffer addresses as outlined hereinbelow.

A better understanding of the present invention may be obtained in the following description and accompanying figures, in which.

Figures 1, 1A:
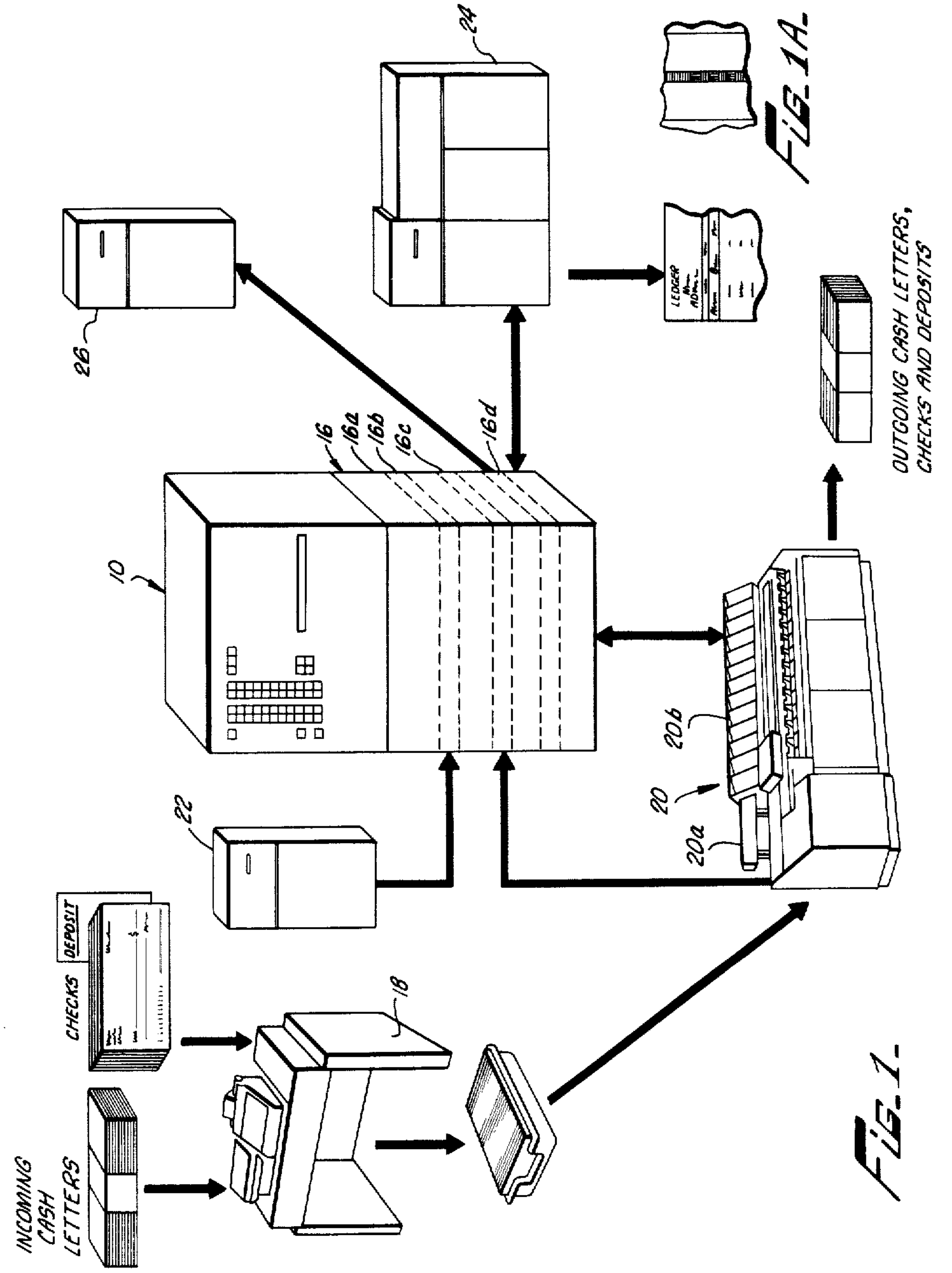
FIG. 1 is a pictorial view of a banking system.
FIG. 1A shows a diagrammatic illustration of a magnetically coded stripe arranged for use on the back of ledger cards.
Figures 9, 9A:
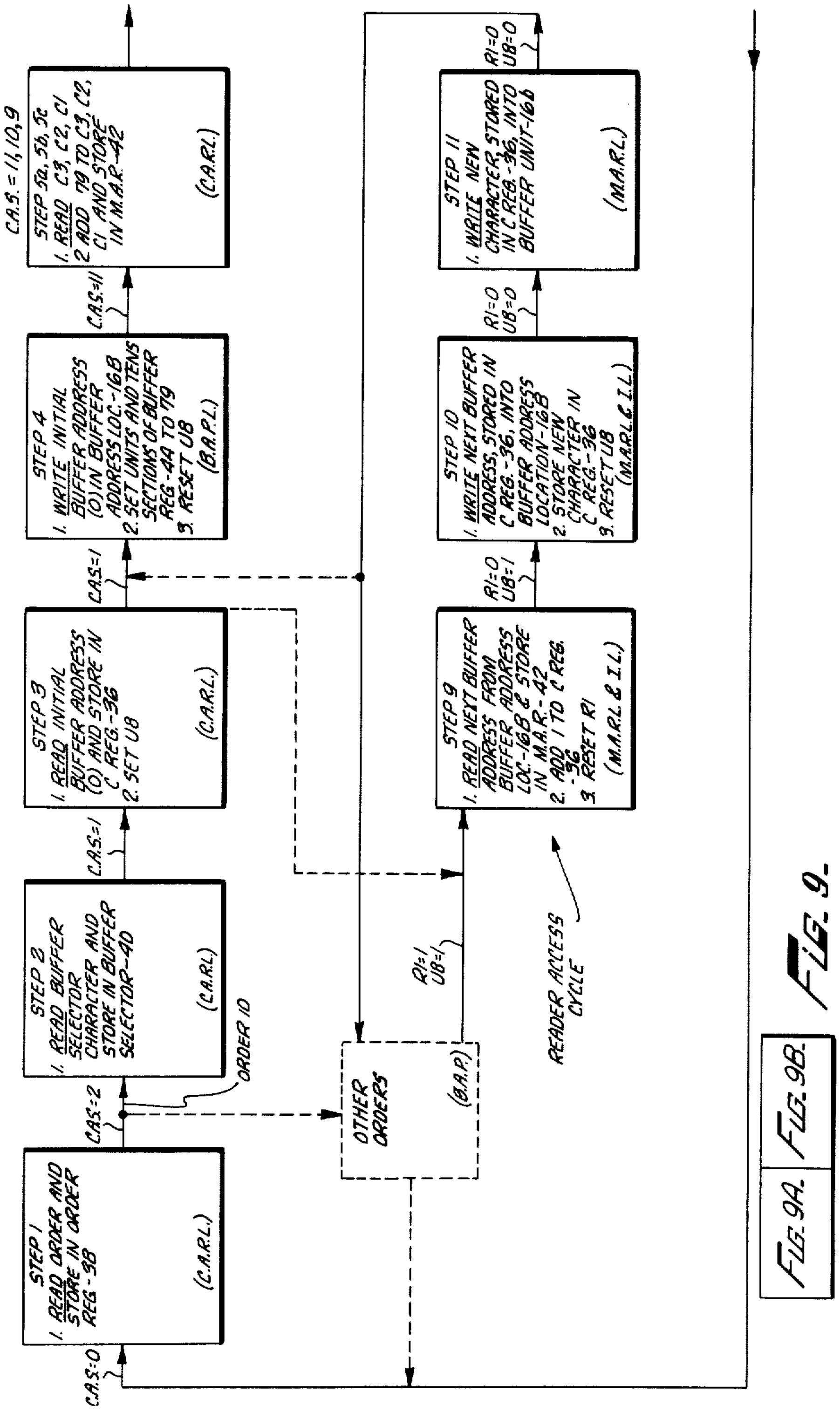
Figure 9B:
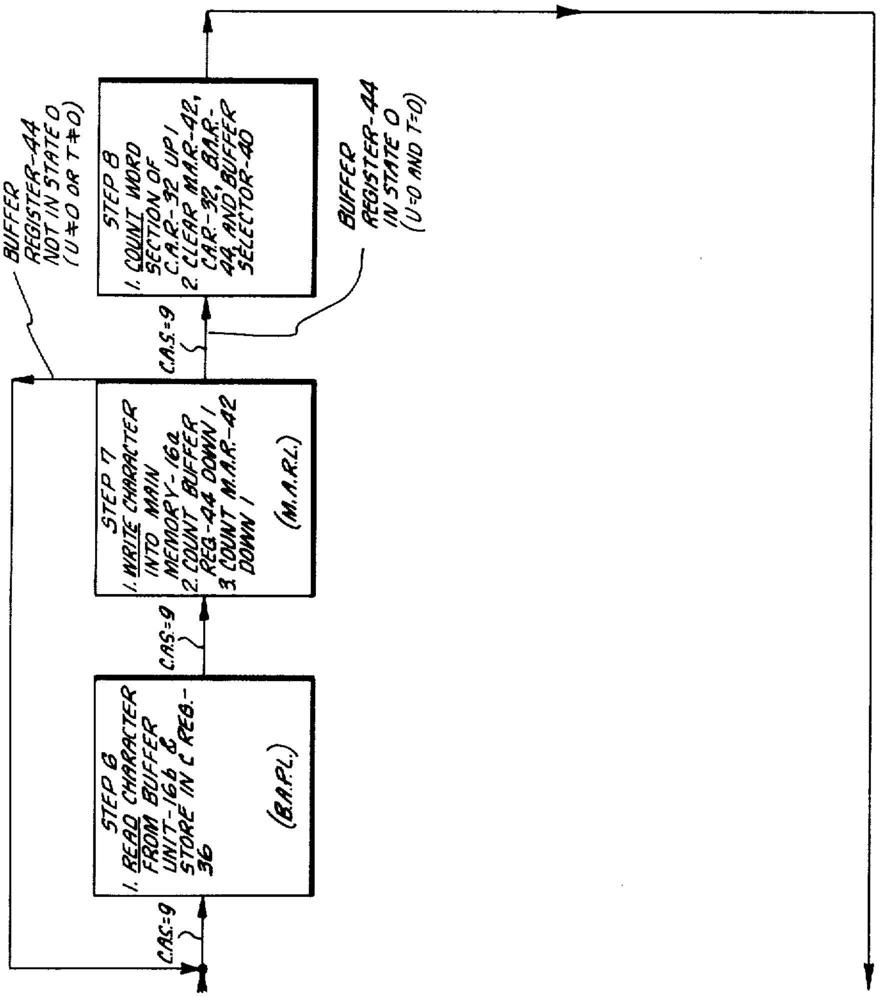

FIGS. 9A and 9B form a flow diagram illustrating the sequence of operation of the digital data processor of the banking system of FIG. 1; and, FIG. 9 shows the association between FIGS. 9A and 9B.

FIG. 1 is a pictorial view of a bookkeeping and accounting system for use in a bank. The banking system of FIG. 1 does all the collating, calculating and summarizing for bookkeeping and updating ledger cards normally accomplished by multiple runs in other automatic banking systems. At the center of the banking system is a digital data processor 10 which is the nerve center or central control and processing unit of the banking system. The digital data processor 10 has a circuit arrangement which allows it to handle data a character at a time and to interrupt the execution of each command for transferring information to and from a memory unit or storage means 16. The storage means 16 contains a main memory protion **16*a* and three buffer portions 16*b*, 16*c* and 16*d*. The digital data processor 10 also has the ability to process variable length operands which is accomplished by the use of special field length characters stored in each command. Other details of the digital data processor 10** are described in a co-pending patent application assigned to the same assignee as this patent application and entitled "Digital Data Processor," by Richard S. Sharp, Dan A. Neilson, and James R. Bennett, filed on January 3, 1961 and bearing Serial No. 80,171.

At the left of the digital data processor 10 is shown a program card reader 22. The program card reader 22 is the unit used for providing the stored program, consisting of commands, for controlling the operation of the data processor 10. The program card reader 22 is a high-speed punched card reader which reads the data processor program stored on punch cards a character at a time and presents signals corresponding to the characters to the data processor 10. The data processor 10 is arranged so that the characters of data read by the program card reader 22 are stored in the buffer unit **16*b* of the storage means 16**.

At the left of the data processor 10 is depicted an adding machine type amount encoder 18 which may be used by the proof department of a bank to encode or print account numbers and amount numbers separately or in combination on incoming cash letters, checks and customer deposit slips. All the encoding or printing done by the encoder 18 is done in Magnetic Ink Character Recognition (MICR) coded characters. MICR is a special type of code developed and standardized under the sponsorship of the American Banking Association for use on customer checks, et cetera.

The encoded cash letters, checks and deposit slips are taken from the encoder 18 and put into the read unit **20*a* of a special high-speed item sorter reader 20. The reader unit 20*a* of the item sorter reader 20 is the device which actually introduces new characters of data into the data processor 10 for editing and processing. The sorter unit 20*b* is mechanically and electrically coupled to the reader unit 20*a*, receives documents from the reader unit 20*a* and stores them in one of thirteen pockets provided therein. The documents or cash letters, checks and deposit slips are fed by the reader unit 20*a* one at a time past a magnetic read station, provided in the reader 20*a*, into the sorter unit 20*b* of the item sorter reader 20. The magnetic read station reads the magnetically encoded information printed on a single document and transmits the information by means of digital coded signals a character at a time to the buffer unit 16*c* of the storage means 16. The digital data processor 10 reads the coded signals and on the basis of these signals makes decisions and provides control signals to the sorter unit 20*b* of the item sorter reader 20 causing it to direct the document which was read to the correct one of the thirteen sorter pockets. Any transfer of information between the data processor 10 and the sorter 20*b* is done directly through the main memory 16*a* of the storage means 16. The characters of magnetically encoded information which were read from the document in the reader 20*a* and stored in the storage means 16 of the digital data processor 10** are then processed using the stored program to direct the processing. An item sorter reader such as that described above is discussed in a co-pending application assigned to the same assignee as this patent application and entitled "Item-Data Processor," in the names of T, A, Dowds, M. W. Marcovitz, C. C. Perkins and W. W. Phillips, filed on September 8, 1960, and bearing Serial No. 54,638, which has other references specifically directed to the sorter reader unit.

A visual record processor 24 is connected to the main memory **16*a* of the storage means 16 for processing ledger cards. The ledger cards processed by the visual record processor 24 have visual information printed on the front and magnetic stripes on the bank, on which information is encoded or written. FIG. 1-A shows a diagrammatic illustration of a magnetically coded stripe arranged for use on the back of ledger cards. The magnetic strip on the ledger cards may have coded information written thereon such as a previous balance of an individual's bank account, as well as codes to identify the next available printing line on the ledger card and to identify special types of records. The visual record processor 24 automatically feeds ledger cards and reads the magnetically encoded stripes on the back of ledger cards. This information is then fed to the processor 10 where it is merged and processed with the new data characters from the reader 20*a* and then shifted back out through the memory portion 16*a* to the visual record processor 24** for printing of visual information on the same ledger card, as well as for magnetically encoding the new balance on the back of the ledger card. The visual information printed on the ledger cards may be amount of transactions, the dates and the new balance of an account. A visual record processor such as that described above is disclosed in the above referenced co-pending patent application by T. A. Dowds et al.

Also provided is a card punch unit 26. The card punch unit 26 receives information a character at a time from the output of the buffer unit **16*d* of the memory unit 16**. The card punch unit is used for punching and storing information on punched cards for storage.

Figure 2:
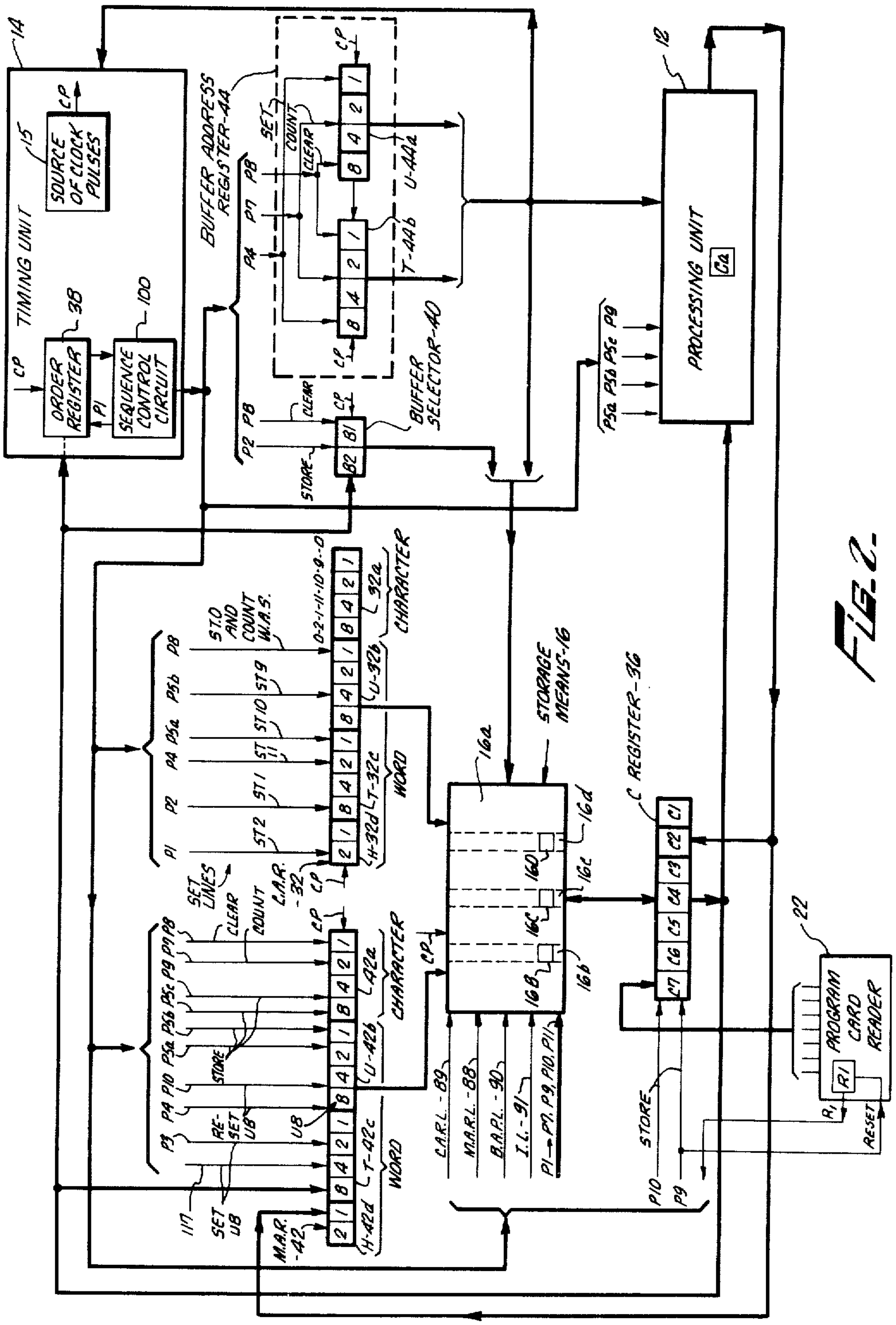
FIG. 2 is a detailed block diagram of the storage system for use in the digital data processor of the banking system of FIG. 1.

With the banking system of FIG. 1 and the general flow of information in mind, a detailed description will be given of the addressing, buffering and memory system used in the digital data processor 10. First, a general description of terminology to be used in the description will be given along with a description of the word structure used by the digital data processor. Following this is a description of the general organization and operation of the portion of the storage system shown in FIG. 2, with reference to the flow diagram of FIG. 9. After the general organization and operation, details of each of the circuits of FIG. 2 are given immediately followed by a detailed description of the operation of each circuit, again making reference to the flow diagram of FIG. 9 to tie in the sequence of their operation.

First, the word structure of information handled by the storage system of FIG. 2 will be described. Unless otherwise stated, all information in the storage system of FIG. 2 is handled by character. Twelve characters compose one word. A character of information consists of seven binary coded digital bits. Generally, one of the bits is a parity bit which is not shown in this patent application and may be ignored for the purpose of this invention. Two of the bits are to convert the character to an alphanumeric character and four of the bits are used for numeric characters. All storage locations in the storage means 16 are arranged for storing a single character of information. All information is read out of the storage means 16 and written into the storage means 16 a character at a time, that is, the bits comprising a character are handled in parallel.

Figure 6:
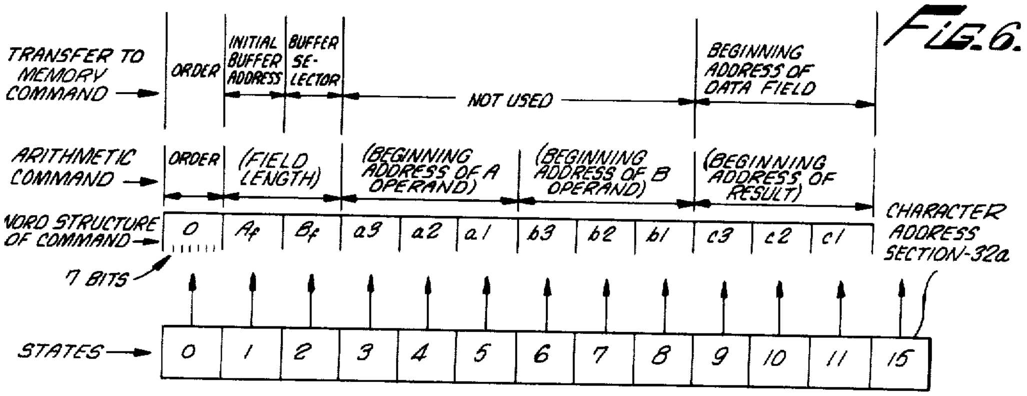
FIG. 6 shows the command structure used by the digital data processor of the banking system of FIG. 1.

Command words are also arranged in characters, as shown in FIG. 6. FIG. 6 shows each command word as having twelve characters. The characters of a command word used for performing arithmetic computations include an order character (designated "0"), two field length characters (designated A*f* and B*f*), six characters for specifying the beginning addresses of two operands (designated A3, A2, A1, and B3, B2, B1), and three characters (designated C3, C2, C1) for specifying the beginning address of a result field.

Figures 7, 8:
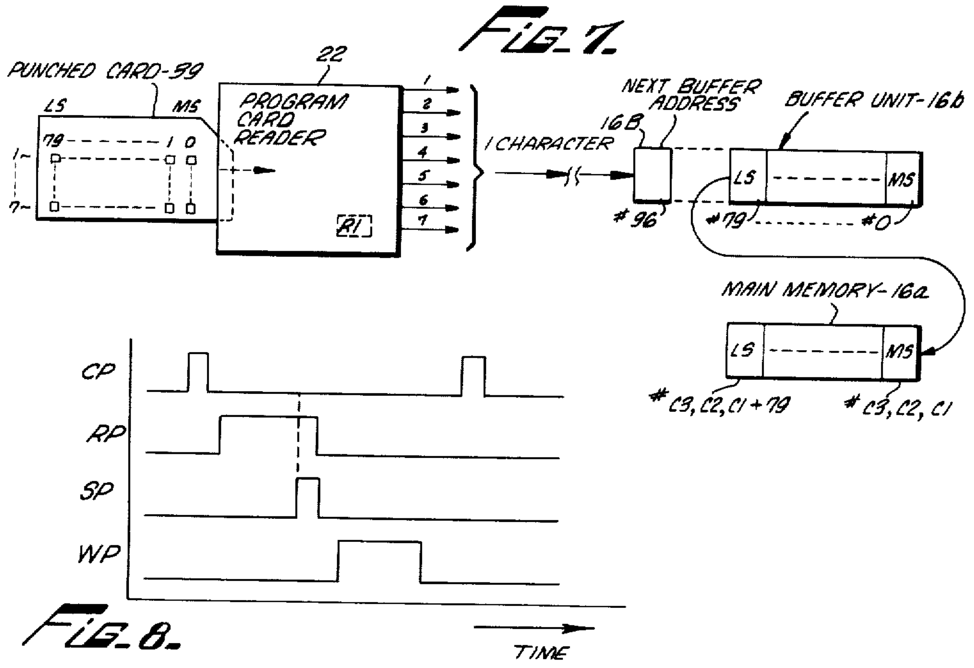
FIG. 7 is an illustrative diagram which shows the flow of information from peripheral input units into the main memory of the digital data processor of the banking system of FIG. 1.
FIG. 8 is a wave shape diagram showing the relation of clock pulses to the read, strobe and write pulses developed by the timing generator of the storage means of FIG. 3.

An initial program for the digital data processor consisting of commands is loaded directly into the storage means 16 under control of special timing circuitry (not shown). Referring to FIG. 7, after the initial program is loaded all subsequent commands are read in from the program card reader 22 to the buffer **16*b* and then transferred to main memory 16*a* for storage and processing under control of the initially stored program. The transfer of commands, as well as other data characters, from peripheral sources of data to the buffers is done during what is called a reader access cycle. A transfer to main memory command is used for controlling the transfer of characters from buffer to main memory 16*a***.

The word structure of the transfer to main memory command is important in the following discussion and is similar to that of the word structure for an arithmetic command. A transfer to main memory command is shown at the top of FIG. 6 and includes an order character, an initial buffer address character which takes the place of one of the field length characters in an arithmetic command, a buffer selector character which takes the place of the other field length character and three characters indicated by the symbols C3, C2, C1 for specifying the beginning address of a data field in main memory which takes the place of the three characters of the beginning address of a result field of an arithmetic command. The character C1 of the beginning address of a data field uses four bits out of seven for designating the address of the twelve characters within each command word. Thus, the character C1 is in the number base 12. The characters C2 and C3 are the characters representing the addresses of command words and represent decimal addresses 0 through 399. The character C2 also uses four bits out of the seven for representing information. The character C2 is a decimal character and designates the units address of a command. The character C3, in contrast, uses six bits of the seven to represent information. The first four bits form the tens portion of a command word, which is a decimal number. The next two bits of the character C3 represent the hundreds address of a command word. The six characters of the beginning addresses of the two operands of an arithmetic command are not used in the transfer to memory command. The initial buffer address character is 0, which is the address in a buffer where the first character of data is to be stored. The buffer selector character has two bits which specify which of the three buffer units **16*b*, 16*c* and 16*d* from which data is to be transferred to main memory 16*a***.

A source of clock pulses 15 in a timing unit 14 (see

FIG. 2) is provided for developing rectangular recurring clock pulses. In the following discussion, all flip-flop circuits are set to "true" state and "false" states at the occurrence of clock pulses. Also, all register circuits store information and are cleared under control of a timing unit 14 only at the occurrence of clock pulses with the exception of the C register 36. Other details of the C register 36 are given in the detailed description of FIG. 2.

*General Description*

Refer now to the general organization of the storage system as shown in FIG. 2. Two addressing registers are provided for providing address signals to the storage means 16. The first is called the command address register 32 and the second is called the memory address register 42. The command address register 32 has a character address section **32*a* and word address sections 32*b*, 32*c* and 32*d*. The word address sections of the command address register 32 partially addresses a group or a word of storage locations in the storage means 16, which stores a command word. Since the reading and storing is done a character at a time, the character address section 32*a*** completes the addressing by addressing the storage location storing a particular character within the command word.

The character address section **32*a* is illustrated in FIG. 6 along with its twelve possible states of operation. Each state of operation of the character address section 32*a* corresponds to a character within a command. Whenever the character address section 32*a* steps into states 0, 1 and 2, the order character, the initial buffer address character and the buffer selector characters of a command stored in the storage means 16 will be addressed and read out. Similarly, whenever the command address section 32*a* is in states 9, 10 and 11, the three characters C3, C2, C1, respectively, of the beginning address of a data field will be addressed and read out of the storage means 16. The other states of operation of the character address section 32*a* are used during the execution of other commands as described in the above-referenced copending patent application by Richard S. Sharp, Dan A. Neilson and James R. Bennett. The memory address register 42** is for addressing storage locations storing other types of characters such as characters of data to be processed.

A buffer selector 40 and buffer address register 44 are also provided. The buffer selector 40 is for selecting which of the buffer units **16*b*, 16*c* and 16*d* whose storage locations are to be addressed by the buffer address register 44. The buffer selector 40** is only used for addressing, for purposes of this description, during the execution of a transfer to main memory command.

A processing unit 12 is provided for incrementing and modifying address signals as well as for processing operands. An intermediate storage register, called the C register 36, is connected to the output and input circuits of the storage means 16 and stores each character of information subsequently stored in the storage means 16 and each character of data read out of the storage means 16. An order register 38 is provided and stores the order character of a command read out of the storage means 16 (after being stored in the C register 36).

The buffers **16*b*, 16*c* and 16*d* each have a next buffer address storage location. The next buffer address storage location for buffers 16*b*, 16*c* and 16*d* are 16B, 16C and 16D** (see FIG. 2), respectively. Each of these locations store an address of a location in the corresponding buffer where the next character from the corresponding peripheral device is to be stored. The next buffer address is not a complete address in the sense that it gives the complete address of a location in memory. The next buffer address is a character which, when combined with other signals which select the corresponding buffer, selects a storage location in the corresponding buffer. Thus, the next buffer address identifies the next location in the corresponding buffer where a character is to be stored.

Refer now to the sequence of operation of the storage system of FIG. 2 as illustrated by the flow diagram of FIG. 9. The flow diagram of FIG. 9 is broken down into eleven different program steps of operation. It should be noted that the program steps 1 through 8 pertain to the transfer to main memory command when characters of data are transferred from one of the buffer units 16*b*, 16*c* and 16*d* to the main memory portion 16*a*. The program steps 9, 10 and 11 refer to the reader access cycle when new characters of data are shifted in from a source of character signals, such as the program card reader 22, and written into the buffer unit 16*b*. The state of the character address section 32*a* of the command address register 32 is shown at the beginning of each program state and is represented by the symbol CAS. Although the operation of buffer unit 16*b* is illustrated in FIG. 9, it should be understood that the operation of the buffers 16*c* and 16*d* in conjunction with the main memory 16*a* is identical. However, as explained in the following discussion, the respective buffer units 16*c* and 16*d* are specified by the contents of the hundreds section 42*d* of the MAR register 42 rather than the buffer unit 16*b*.

Consider the general operation of the storage system of FIG. 2 during the program steps 9, 10 and 11. Referring to FIG. 7, assume that a full 80 columns or characters of information are about to be read from columns 0 through 79 of a punched card 39 by the program card reader 22 and stored in the buffer unit 16*b*. Characters are stored on punched cards with the most significant character in column 0 and the least significant in column 79. When stored in the buffer unit 16*b* they are stored with the most significant character in storage location 0 and the least significant character in storage location 79. Storage location 96, in the buffer unit 16*b*, is the storage location 16B, where the next buffer address is stored. With this arrangement, the storage locations 80 through 95 are not used.

It is important to note that the data processor 10 may either interrupt the execution of a command to enter the reader access cycle defined by the program steps 9, 10 and 11, or enter the reader access cycle at the end of executing a command as described in the above-referenced co-pending patent application by Richard S. Sharp, Dan A. Neilson and James R. Bennett. Thus, in a similar manner, the transfer to main memory operation of program steps 1 through 8 may be followed by a reader access cycle.

Referring to FIG. 2, a reader access flip-flop R1 is provided in the program card reader 22. The reader access flip-flop R1 is triggered on whenever the program card reader 22 has read a character from the punched card 39 and has formed signals which are to be written in the buffer unit 16*b*, then at the time to interrupt the execution of a command, the program step 9 will be entered. Also, previous to program 9, a flip-flop designated U8 in the memory address register 42 is triggered true. This, in combination with the hundreds section 42*d* of the MAR register 42, and other timing signals described in connection with FIG. 3, causes buffer storage location 16B to be addressed during program steps 9 and 10. It should be understood that the reader access flip-flop R1 could also be located in the data processor 10, in which case a set signal would be provided by the program card reader 22 for its control.

During program step 9, the storage location 16B is addressed by the hundreds section 42*d* and the #8 flip-flop (U8) in the units section 42B of the memory address register 42 and the next buffer address is read out and stored into the C register 36. Assume initially that the next buffer address is a character 0. The next buffer address character (0) is then stored in a portion of the memory address register 42. Also, as the next buffer address is read out of the buffer storage location 16B, the processing unit 12 adds one to the next buffer address and the result (a character 1) is stored in the C register 36. Also, the reader access flip-flop R1 is reset to a false state, so that it may again be set true by the program card reader 22 when a reader access cycle is needed.

During program step 10 the new next buffer address (a character 1) stored in the C register 36 is written into the next buffer address 16B. Also, the new character read from a punched card by program card reader 22 is stored in the C register 36 and the U8 flip-flop is reset to a false state. During program step 11 buffer 16*b* is selected by the hundreds section 42*d* and the new character is written into the buffer storage location 0 of buffer 16*b*, as addressed by the next buffer address character stored in the character and units section 42*a* and 42*b* of the memory address register 42.

At this point program step 11 is ended and the digital data processor re-enters the execution of a command, or starts executing a new command, at the same point from which program step 9 was entered. As new characters are read from the punched card by the program card reader 22, and the reader access flip-flop R1 is re-triggered true, the execution of commands are repeatedly interrupted to write the new characters in the buffer unit 16*b*, until the buffer unit 16*b* is full, that is 80 characters have been read from a punched card and stored in the buffer unit 16*b*.

The programmer of the digital data processor determines at about what point in the stored program the buffer unit 16*b* will be full and at this point writes a transfer to main memory command. This causes program steps 1 through 8 to be entered.

Assume that the command address register 32 now is addressing a transfer to memory command word and that the buffer unit 16*b* has 80 new characters stored therein. Referring again to FIG. 7, the buffer unit 16*b* now will have its contents transferred to main memory 16*a* and stored with the most significant characters stored in the storage location of the end of the data field. A data field includes 80 character storage locations in the main memory 16*a*, and includes the storage location with an address equal to the beginning address (C3, C2, C1) of the data field through the storage location with the address (C3, C2, C1)+79, or the next successive 79 character storage locations.

Referring to FIG. 9, assume program step 1 is now entered. The order character of the transfer to memory command is read out of the main memory 16*a*, stored in the C register 36 and then stored in the order register 38. At this point, program step 2 will be entered since the order specifies a transfer to memory command. If another type of order were specified, i.e., add, subtract, et cetera, then other program steps would be entered as described in the above-referenced co-pending patent application by Richard S. Sharp, Dan A. Neilson and James R. Bennett.

During program step 2 the buffer selector character of the command is read out, stored in the C register 36 and then stored in the buffer selector 40. During program step 3, the U8 flip-flop of the memory address register 42 is again set true and then during program step 4 is reset to a false state. During program step 3 the command address register 32 again addresses the storage means 16 causing the initial buffer address, a character 0 to be read out and stored in the C register 36 and then re-stored in the next buffer address storage location 16B during program step 4. The state of the buffer register 44 is also set to represent a decimal 79 during program step 4.

During program steps 5*a*, 5*b* and 5*c*, the three characters C3, C2 and C1, respectively, of the beginning address of the data field of the command, are read out of the main memory 16*a*. The processing unit 12 adds the decimal 79 to the decimal number represented by the characters of the beginning address of the data field (C3, C2, C1) and the result is stored in the memory address register 42.

At this point program steps 6 and 7 are entered. During program step 6, the storage location 79 of the buffer unit 16*b*, is addressed by the buffer address register 44 since it is in state 79, and the least significant character stored there is read out and stored in the C register 36. During program step 7 the least significant character stored in the C register 36 is written into the memory storage location C3, C2, C1+79, which address is stored in the memory address register 42. The state of the memory address register 42 and the buffer address register 44 are now counted down one unit and program steps 6 and 7 are again entered, where the next character is transferred from buffer unit 16*b* to main memory 16*a*. The data processor of FIG. 2 now repeatedly cycles through program steps 6 and 7 until all characters are transferred from the buffer unit 16*b* to main memory 16*a*. When all characters stored in the buffer 16*b* are transferred to main memory 16*a*, the buffer address register is in state 0 and program step 8 is entered, where the word section of the command address register 32 is counted up one unit to select the next command in the stored program and program step 0 is again entered.

*Detailed Description*

Figure 4:
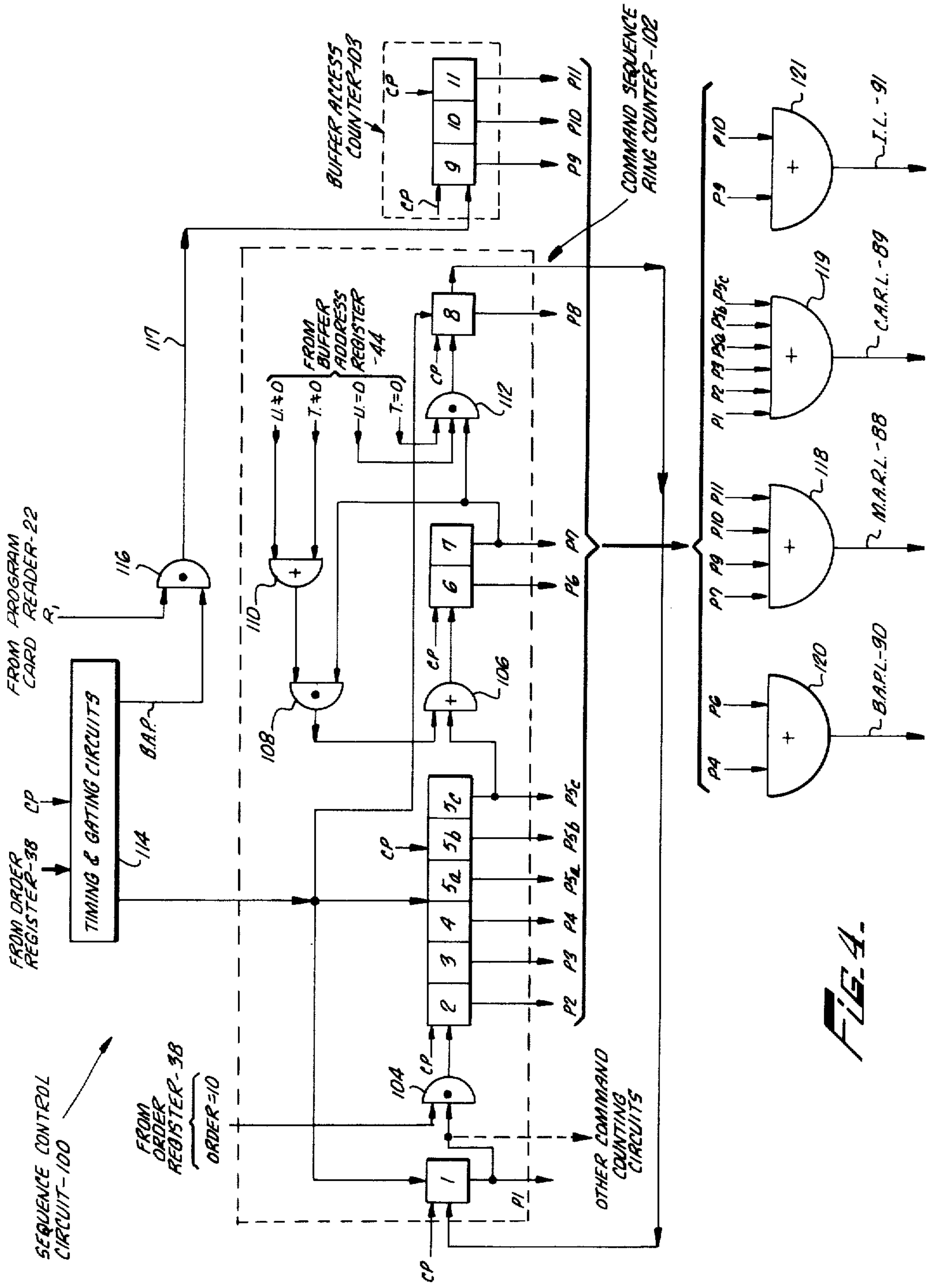
FIG. 4 is a sequence control circuit for use in the storage system of FIG. 2.

With the sequence of operation of the storage system of FIG. 2 in mind, a description will now be given of the timing unit 14 (see FIG. 2). For purposes of illustration, a sequence control circuit 100 is provided which contains separate counters and gating circuits for sequencing the operation of the storage system of FIG. 2. However, it should be understood that other timing circuits may be used such as the combination of several timing flip-flops and gating circuits in combination with the character address section 32*a* of the command address register 32. FIG. 4 shows the details of the sequence control circuit 100. Referring now to FIG. 4, a ring type command sequence counting circuit 102 is provided which has ten different states for providing ten different states of operation. The stages will be referred to as stages 1 through 4, 5*a*, 5*b*, 5*c*, 6, 7 and 8 and have output circuits P1 through P4, P5*a*, P5*b*, P5*c*, P6, P7 and P8, respectively. High potential signals are developed at the output circuits corresponding to the states of operation of the command sequence ring counter 102. All the stages of the ring counter 102 are connected in a cascaded fashion, one to the other, except stages 1 and 2, 5*c* and 6, 7 and 8, which have gating circuits 104, 106 and 112, respectively, connected between those stages. The gating circuit 104 is an "and" type gating circuit and has two input circuits which are connected to the P1 output circuit of the first stage of counter 102 and the order register 38. The input circuit connected to the order register 38 is connected to gating circuits (not shown) in the order register 38, which causes a high potential output signal thereon whenever a binary coded decimal order 10 is stored in the order register 38. An order 10 specifies a transfer to memory command.

The gating circuit 106 is an "or" type gating circuit and has two input circuits, one of which is connected to the P5*c* output circuit and the other to the output circuit of an "and" gating circuit 108. The "and" gating circuit 112 has three input circuits which are connected to the P7 output circuit of the counter 102 and output circuits of the units and tens sections 44*a* and 44*b* of the buffer register 44. A high potential signal will be developed at the input circuits of the "and" gating circuit 112 by the units and tens sections 44*a* and 44*b* when the units and tens sections 44*a* and 44*b*, respectively, are in state 0.

The "and" gating circuit 108 has two input circuits which are connected to the output circuit P7 and the output circuit of an "and" gating circuit 110. The "and" gating circuit 110 has two input circuits which are connected to output circuits of the units and tens sections 44*a* and 44*b* of the buffer register 44. The output circuits of the units and tens sections 44*a* and 44*b* connected to the "and" gating circuit 110 provide a high potential signal whenever the states of the units and tens sections 44*a* and 44*b*, respectively, are not equal to 0, as indicated in the drawing.

Consider now the operation of the command sequence ring counter 102. The sequence of states of operation and their representation coincide with the sequence of operation indicated by the program steps of FIG. 9. Referring to FIGS. 4 and 9, initially, the command sequence ring counter 102 is set into state 1 by the timing and gating circuits 114 by control circuits (not shown). If a binary coded decimal number ten is stored in the order register 38, the following clock pulse triggers the command sequence ring counter 102 into state 2, otherwise stage 1 is triggered off and none of the stages are triggered on, in which case the command sequence ring counter 102 goes into state 0, and remains there until the timing and gating circuits 114 trigger the counter back to state 1. With the command sequence ring counter 102 in state 2, the following seven clock pulses trigger the ring counter into states 3, 4, 5*a*, 5*b*, 5*c*, 6 and 7. Whenever the command sequence ring counter 102 is in state 7, and either one or the other, or both of the units and tens sections 44*a* and 44*b*, are not in state 0, a high potential output signal will be developed by the gating circuits 108 and 106 causing the command sequence ring counter 102 to be triggered into state 6 at the following clock pulse. Whenever the command sequence ring counter 102 is in state 7, and the units and tens sections 44*a* and 44*b* of the buffer address register 44 are both in state 0, a high potential output signal is developed by the "and" gating circuit 112 and at the following clock pulse the command sequence ring counter 102 is set into state 8. The following clock pulse causes the command sequence ring counter 102 to be triggered back into state 1, where the sequence of operation is repeated.

The timing and gating circuits 114 have an output circuit referenced by the symbol BAP. The timing and gating circuits 114 have timing circuits (not shown) which provide a control signal at the BAP output circuit thereof whenever the data processor is in such state executing a command that the execution of the command can be momentarily interrupted to allow a character of data to be read from the program card reader 22 and stored in the buffer 16*b*. The timing and other circuits for providing the signal at the BAP output circuit and for momentarily inhibiting the execution of the command when the program card reader 22 has a character to be read by the data processor and stored in the buffer 16*b* is described in the above-referenced co-opending patent application by Richard S. Sharp, Dan A. Neilson, and James R. Bennett. A high potential signal is developed at the BAP output circuit by the timing and gating circuits 114 whenever the execution of a command is interrupted to allow a buffer access cycle. The output circuit BAP of the timing and gating circuits 114 is connected to the input circuit of an "and" gating circuit 116. The "and" gating circuit 116 has another input circuit connected to the output circuit $R_1$ of the reader access flip-flop R1 in the program card reader 22. The output circuit of the "and" gating circuit 116 is connected to an input circuit of a buffer access counter 103. The buffer access counter 103 has three states of operation (and corresponding stages) which are referred to as states 9, 10 and 11. Three output circuits are provided which are referred to as the P9, P10 and P11 output circuits and will have a high potential signal thereon whenever the buffer access counter is in a corresponding state of operation. Whenever the buffer access flip-flop R1 is true, a high potential is developed at the $R_1$ output circuit, and when the output circuit BAP of the timing and gating circuits 114 is at a high potential the following clock pulse will trigger the buffer access counter 103 into state 9. The following two clock pulse will then trigger the buffer access counter 103 into states 10, 11 and 0. In state 0 none of the stages 9, 10 or 11 are activated. The buffer access counter 103 remains in state 0 until a high potential signal is developed by the "and" gating circuit 116, causing state 9 to be entered again.

The sequence control circuit 100 has four "or" gating circuits 118, 119, 120 and 121 for developing signals on a MARL line 88, a CARL line 89, a BAPL line 90 and an IL line 91. The "or" gating circuit 118 is connected to the output circuits P7, P9, P10 and P11 of the command sequence ring counter 102 and the buffer access counter 103. The "or" gating circuit 119 is connected to the P1, P2, P3, P5*a*, P5*b* and P5*c* output circuits of the command sequence ring counter 102. The "or" gating circuit 120 is connected to the P4 and P6 output circuits of the command sequence ring counter 102. The "or" gating circuit 121 is connected to the P7 and P10 output circuits of the reader access counter 103.

Thus, with reference to FIGS. 4 and 9, it will be seen that a memory address register level signal will be developed on the MARL line 88 whenever the ring counters 102 and 103 are in states 7, 9, 10 and 11, a command address register level signal will be developed on the CARL line 89 whenever the command sequence ring counter 102 is in states 1, 2, 3, 5*a*, 5*b* and 5*c*, a buffer access permitted level signal will be developed on the BAPL line 90 whenever the command sequence ring counter 102 is in states 4 and 6, and an inhibit level signal will be developed on the IL line 91 whenever the reader access counter 103 is in states 9 and 10.

The order register 38 is connected to the output circuit of the C register 36. The order register 38 also has a central circuit connected to the P1 output circuit of the command sequence ring counter 102 of the sequence control circuit 100. Referring to FIG. 9, an order character is stored in the C register during program step 1, and the high potential signal at the P1 output circuit causes the order character to be stored in the order register 38.

With the details of the timing unit 14 and the memory unit 16 in mind, the details of the register circuits shown in FIG. 2 will now be described. The command address register 32 and a memory address register 42 each have fourteen flip-flop circuits for representing twelve states of operation. Referring to the character address section 32*a* of the command address register 32, this section has four flip-flops represented by the numbers 1, 2, 4 and 8. The numbers of the flip-flops are weighted to represent coded information. The sum of the numbers of all flip-flops which are true is the number of the state represented thereby. If all of the flip-flop circuits in the character address section 32*a* are false, the character address section 32*a* is said to be in state 0, whenever the number one flip-flop is true it is in state 1, whenever the number 8 and number 4 flip-flops are true, it is in state 12, et cetera. The twelve possible states of operation of the character address section 32*a* are for addressing the twelve characters of a command (see FIG. 6).

The units section 32*b* of the command address register 32 and the tens section 32*c* of the command address register 32 have four flip-flop circuits also number weighted number 1, number 2, number 4 and number 8. The hundreds section 32*d* of the command address register 32 has two flip-flops number weighted number one and number two. The word address sections 32*b*, 32*c* and 32*d* use a total of 400 possible states to represent 400 total words of storage in the storage means 16. The states and addresses are represented by the decimal numbers 0 through 399. Thus, the units section 32*b* has states 0 through 9, the tens section 32*c* has states 0 through 9 and the hundreds section has states 0 through 3. Whenever all of the flip-flop circuits in the units, tens and hundreds sections of the command address register 32 are false, the word address specified thereby is 0. Whenever the number 1 flip-flop in the units section 32*b* is the only flip-flop in the word section that is true word 1 is specified thereby, whenever only the number 1 flip-flop in the tens section 32*c* is true word 10 is specified thereby, et cetera. The same general description is true for the corresponding sections of the memory address register 42, except that words and characters of operands or other data characters are addressed by the memory address register 42, rather than words and characters of commands.

The command address register 32 is connected to the P1, P2, P4, P5*a*, P5*b* and P8 output circuits of the command sequence ring counter 102 in the sequence control circuit 100. The input circuits of the command address register 32 from the sequence control circuit 100 are set lines for setting the character address section 32*a* into its various states of operation and for counting the word address or state represented by the word sections 42*b*, 42*c* and 42*d* up 1. The set line for setting the character address section 32*a* into states 0, 1, 2, 9, 10 and 11 are connected to the output circuits P8, P2, P1, P5*b*, P5*a* and P4 of the command sequence ring counter 102 in the sequence control circuit 100. Whenever a high potential set signal is developed on one of the set lines, the character address section 32*a* is set into the corresponding state of operation as outlined above, at the occurrence of the following clock pulse signal. Whenever a clock pulse occurs coincident with a high potential at the P8 output circuit of the command sequence ring counter 102, the word section of the command address register 32 counts up one state, sequentially stepping from state 0 up to state 399 and then re-cycling back to state 0.

The memory address register 42 also has input circuits connected to the line 117 out of the "and" gating circuit 116 (see FIG. 4) and the P3, P4, P5*a*, P5*b*, P5*c*, P7, P8, P9 and P10 output circuits of the command sequence ring counter 102 and the buffer access counter 103. Referring to FIGS. 2 and 9, whenever a high potential signal is developed either on the line 117 (at the beginning of a reader access cycle) or the P3 output circuit of the command sequence ring counter 102, the following clock pulse causes the U8 flip-flop in the units section 42*b* to be set to a true state. In addition, the control signal on line 117 causes the hundreds section 42*d* of the memory address register 42 to be set to a predetermined state which causes the buffer 16*b* to be addressed when a signal is applied to the MARL line 88. The gate 116 applies the control signal on line 117 which causes the signal to be stored in the hundreds section 42*d* for selecting buffer 16*b*. The gates for causing the hundreds section 42*d* to store a signal selecting each of the other buffers, 16*c* and 16*d*, are not shown herein. Only gate 116 for selecting buffer 16*b* is shown herein for purposes of explanation. It will be obvious to those skilled in the art that another gate, similar to the gate 116, can be added for causing the hundreds section 42*d* to store a signal selecting each of the other buffers 16*c* and 16*d* in a similar manner to that shown herein for buffer 16*b*. When a high potential signal is developed at the P4 and P10 output circuits of the command sequence ring counter 102, and the buffer access counter 103, the following clock pulse resets the U8 flip-flop to a false state. Whenever a high potential signal is developed at the output circuits P5*a* and P5*b* of the command sequence ring counter 102, the following clock pulse causes the character of digital signals developed at the output of the processing unit 46 to be stored in the 42*a* and 42*b* sections of the memory address register 42, respectively. A high potential signal at the P5*c* output circuit of the command sequence ring counter 102 at the occurrence of a clock pulse causes the character of data developed at the output of the processing unit 46 to be stored in both the 42*c* and 42*d* sections of the memory address register 42. It should be noted that normally four binary bits are stored in the character address section 42*a* and the word address section 42*b*, whereas when a character is stored in the tens section 42*c* and the hundreds section 42*d*, six binary bits of a character are stored at once.

The next buffer address character is seven bits in length and when read from the buffer and stored in the C register 36 occupies flip-flops C1 through C7. The next buffer address is read out and stored in the C register 36 preceding the formation of the signal at P9. The high potential signal at the P9 output of the command sequence ring counter 102 causes the seven bits of the next address stored in flip-flops C1 through C7 of the C register 36 to be stored into the #1, #2, #4, #8, flip-flops of the character section 42*a* and flip-flops #1, #2 and #4 of the units section 42*b* of the memory address register 42. Thus, following the signal at P9 the hundreds section 42*d* selectes the appropriate buffer and the character section 42*a* and the #1, #2 and #4 flip-flops of the units section 42*b* selects the next storage location in the selected buffer where a character is to be stored.

Whenever a high potential signal is developed at the output circuit P7, it causes the state of the memory address register 42 to increase by one at the following clock pulse. A high potential signal developed at the P8 output circuit of the command sequence ring counter 102 causes all of the flip-flop circuits in the memory address register 42 to be reset to a false state at the following clock pulse.

With the details of the memory address register 42 and the command address register 32 in mind, details will now be given of the buffer address register 44 and the buffer selector 40. The buffer address register 44 and the buffer selector 40 are used to address the buffers only during a transfer to main memory operation. Both the units and tens sections 44*a* and 44*b* of the buffer address register 44 have four flip-flop circuits number weighted #1, #2, #4 and #8 which address the storage locations 0 through 79 of the buffer units 16*b*, 16*c* and 16*d*. The units section 44*a* of the buffer address register 44 has twelve possible states of operation, referred to as 0 through 11. The tens section has nine possible states of operation 0 through 8. The units section 44*a*, therefore, operates in the number base 12 and the tens section 44*b* to the number base 10. Thus a carry is propagated to the tens section by the units section 44*a* whenever the units section goes from state 11 to state 0. The two flip-flops B1 and B2 of the buffer selector 40 are also number weighted for selecting one of the three buffers 16*b*, 16*c* and 16*d* which is to be addressed by the buffer address register 44 during the execution of a transfer to main memory command. The buffer selector 40 has an input circuit connected to the output circuit of the C register 36 and two control circuits connected to the P2 and P8 output circuits of the command sequence ring counter 102.

Referring to FIG. 9A, a high potential signal is developed at the P2 output circuit of the command sequence ring counter 102 during program step 2 and the following clock pulse causes the two bits of a character stored in the C1 and C2 flip-flops of the C register 36 to be stored in the B1 and B2 flip-flops, respectively. A high potential signal is developed at the P8 output circuit of the command sequence ring counter 102 during program step 8 and the following clock pulse clears or resets both the flip-flops B1 and B2 to a false state.

The units and tens sections 44*a* and 44*b* of the buffer address register 44 have three control circuits. These control circuits are connected to the P4, P7 and P8 output circuits of the command sequence ring counter 102. Referring to FIG. 9A, a high potential signal is developed at the output circuit P4 of the command sequence ring counter 102 during program step 4 and causes both the units and tens sections 44*a* and 44*b* to be set so that the buffer register 44 represents a decimal 79 at the following clock pulse. During program step 7 a high potential signal is developed at the P7 output circuit of the command sequence ring counter 102, causing the buffer address register 44 to count the number stored therein down by one decimal digit. During program step 8, a high potential signal is developed at the P8 output circuit of the command sequence ring counter 102, which causes both sections of the buffer register 44 to be cleared or reset to state 0 at the following clock pulse.

The processing unit 12 has an input circuit connected to the output circuit of the C register 36 and the output circuits of the units and tens sections 44*a* and 44*b* of the buffer address register 44. The processing unit 12 also has four input control circuits connected to the P5*a*, P5*b* and P5*c*, and P9 output circuits of the command sequence ring counter 102 and the buffer access counter 103. As pointed out, the first character (C1) of the beginning address of a data field is in a number system having a base 12 and the data processor is in program step 5*a* whenever the first character (C1) of the beginning address of the data field is stored in the C register 36. The high potential signal at the output circuit P5*a*, during program step 5*a*, causes adding and gating circuits (not shown) in the processing unit 12 to add the character stored in the C register 36 to the state represented by the units section 44*a* of the buffer unit 44 in the number base 12. If the sum of the two characters is greater than a decimal eleven, there is a carry-out which is stored in a carry flip-flop C*a*, in the processing unit 12, for addition to the next character (C2) of the beginning address of the data field.

During program step 5*b*, the second character (C2) of the beginning address of a data field is stored in the C register 36. When a high potential is developed at the output circuit P5*b* of the command sequence ring counter 102, the processing unit 12 adds the character (C2) stored in the C register to the state of the tens section 44*b* of the buffer address register 44 to the number base 10 taking into account any carry from the previous addition (indicated by the state of the carry flip-flop C*a*). The third character (C3) of the beginning address of the data field carries a character which represents both the tens and the hundreds numbers of the address of the beginning of a data field. The third character (C3) is stored in the C register 36 during program step 5*c*. When the high potential signal is developed at the P5*c* output circuit of the command sequence ring counter 102 during program step 5*c*, the processing unit 12 adds any carry from the previous addition (indicated by the carry flip-flop C*a*) to the third character (C3) of the beginning address of the data field, taking into account the hundreds portion of the character. During program step 9, the next buffer address character is stored in the C register 36. Other adder and gating circuits (not shown) are provided in the processing unit 12 for adding a decimal one to the character stored in the C register 36 during program step 9 when the high potential signal is developed at the P9 output circuit of the reader access counter 103. Binary coded signals corresponding to the above additions are developed at the output circuit of the processing unit 12 so that they may be read and stored by the memory address register 42. It should be understood, however, that adding one to the contents of the C register could be accomplished partially by gating circuits and partially by the processing unit 12, as well as being done entirely by the processing unit 12.

Figure 3:
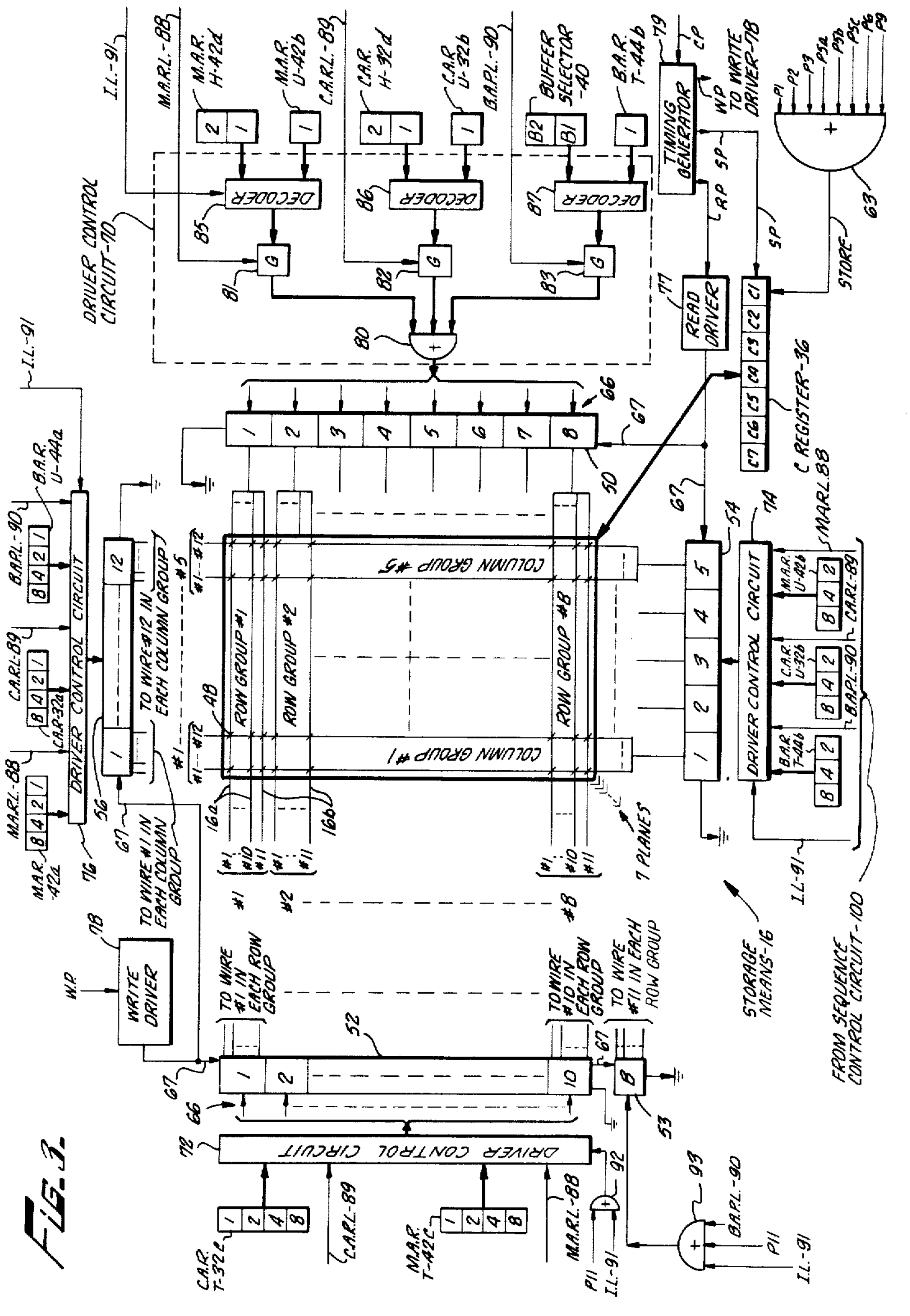
FIG. 3 is a detailed schematic diagram of the storage means along with the associated addressing registers used by the digital data processor of the banking system of FIG. 1.

A detailed description will now be given of the storage means 16 and the method in which it is addressed by the various addressing registers. FIG. 3 is a detailed schematic and block diagram showing the storage means 16, as well as its associated addressing registers. The storage means 16 is a coincident current magnetic core storage unit having eighty-eight rows and sixty colums of magnetic cores 48, each of which have a substantially rectangular hysteresis loop. Addressing switches 50 are provided with eight current switching circuits numbered #1 through #8. Separate electrical current conducting wires or conductive means are separately threaded through each of the rows and columns of cores, and intersect at the cores in a conventional coincident current core memory arrangement. The eighty-eight rows of wires and associated core units are divided into eight groups of eleven, called row groups #1 through #8, with one end of each group of wires connected together and connected at the output of a correspondingly numbered one of the current switching circuits 1 through 8 in the addressing switches 50. Addressing switches 52 are provided at the other end of the row groups #1 through #8. The addressing switches 52 have ten isolated current switching circuits numbered #1 through #10, each of which have eight separate output wires through which current is passed. The eight output wires of the isolated switching circuit #1 of the addressing switches 52 are individually connected to a separate one of the #1 wires in each of the row groups #1 through #8; similarly, the eight output wires of the isolated current switching circuit #2 of the addressing switches 52 are individually connected to a separate one of the #2 wires in each of the row groups #1 through #8, et cetera.

Addressing switches 54 are provided which are identical to the current addressing switches 50, except that only five current switching circuits numbered #1 through #5 are provided instead of eight. The conductors and associated core units in the sixty columns are divided into five groups of twelve columns each and each column group has its twelve conductors connected together at one end to a correspondingly numbered current switching circuit in the addressing switches 54.

Similar to the addressing switches 52, addressing switches 56 are provided having twelve isolated current switching circuits. Each of the twelve current switching circuits of the addressing switches 56 has twelve separate output wires. The twelve separate output wires of the #1 through #12 current switching circuits of the addressing switches 56 are individually connected to a separate one of the #1 through #12 wires, respectively, in each of the column groups #1 through #5 similar to the connection of the wires in the row groups #1 through#8 with the address switches 52.

Figure 5:
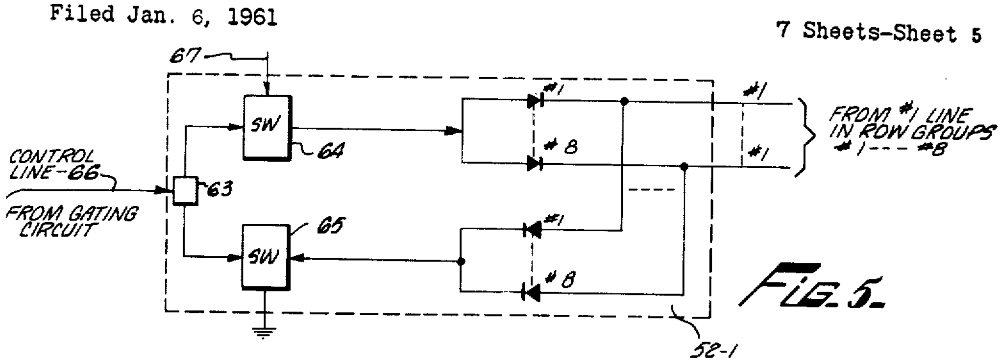
FIG. 5 is a schematic diagram of a current switching circuit for use in the storage means of FIG. 3.

FIG. 5 shows a schematic diagram of the isolated current switching circuit #1 in the addressing switches 52. Referring now to FIG. 5, the #1 wires in each of the row groups #1 through #8 are connected in series with two sets of eight isolation circuits, which in this case are silicon type isolation diodes. The two sets of diodes are poled in opposite directions and are connected to the #1 lines in each of the row groups #1 through #8 to allow current to flow in both directions in the wires. The other end of one group of diodes is connected to the switch 64 and the other group of diodes is connected to a switch 65. The switch 64 has one input circuit connected to a control line 66 through a coupling circuit 63 and another input circuit connected to a line 67. The switch 65 is also connected through the coupling circuit 63 to the control line 66 and to a source of potential or ground potential (0 volts).

The current switching circuits #1 through #12 in the addressing switches 56 are similar to the current switching circuit #1 in the addressing switches 52 except that there are five diodes rather than eight in each group. The current switching circuits #1 through #8 in the addressing switches 50 and 54 are also similar except that the isolation diodes are eliminated and the wires in the column groups are connected directly to read and write switches similar to the read and write switches 64 and 65.

Whenever a high potential control signal is developed on one of the control lines 66 to the current switching circuits in each of the addressing switches 50, 52, 54 and 56, it turns the selected current switching circuit on. To be explained, a read driver 77 develops a read pulse on the line 67 to the addressing switches 50 and 54 following each clock pulse. This causes current to flow through a switching circuit thereof to the selected lines in the columns and rows to the opposite addressing switches 52 and 56. The read current flows through one set of isolation diodes in the selected current switching circuit of the addressing switches 52 and 56 through a switching circuit therein to ground. Also, to be explained, a write driver 78 develops a write current on the write line 67 to the addressing switches 52 and 56. This causes current to flow through the selected current switching circuit through the selected isolation diodes to the selected lines in the rows and columns. The read current flows through the selected lines in the rows and columns to the selected current switching circuit in the opposite addressing switches 50 and 54 to ground.

A timing generator 79 is provided and has three output circuits designated RP for read pulse, SP for strobe pulse and WP for write pulse. The timing generator 79 has an input circuit connected to the CP output circuit of the source of clock pulses 15 (see FIG. 2).

It should also be noted that there are seven planes of cores which are connected to the address switches in parallel in a conventional fashion as described in Chapter 3 of the book entitled "Digital Computer Components and Circuits," by R. K. Richards and published by D. Van Nostrand Company, Incorporated, in 1957. Each plane of core units corresponds to one of the flip-flop circuits C1 through C7 in the C register 36 and is arranged for storing one of the seven bits of a character of information read from the corresponding one of the seven planes.

The input circuit of each of the flip-flops C1 through C7 of the C register 36 has separate sense amplifier and gating circuits (not shown). There is a sense amplifier for each plane of core units. Whenever a read signal is provided to the memory unit 16, the bits of the character in the addressed storage location of all planes is read out of the memory unit 16 by the sense amplifiers and gating circuits and presented as high and low signals for storage by the C register 36. Seven separate inhibit drivers and gating circuits (not shown) are provided in the C register 36 and one is connected between the output circuits of each of the flip-flop circuits of the C register 36 and the corresponding one of the planes of core units in the storage means 16. An inhibit current is provided to each of the planes via inhibit windings (not shown) corresponding to a flip-flop in the C register 36 which is storing a binary digit 0. This prevents the addressed core unit in that plane of core units from being set. The core units in all planes which do not receive an inhibit current signal are set by the coincident current write signals.

The C register 36 has a control circuit for controlling the storing of characters read out of the storage means 16. The control circuit is connected to an "or" type gating circuit 63 shown in FIG. 3. The input circuits of the "or" gating circuit 63 are connected to the P1, P2, P3, P5*a*, P5*b*, P5*c*, P6 and P9 output circuits of the sequence control circuit 100. Similar to the CP input circuit, the C register has a second input circuit for receiving timing pulses. This input circuit is connected to the SP output circuit of the timing generator 79. To be explained, the pulses from SP are used for setting the flip-flop circuits of the C register 36 during read-out from the storage means 16, while a read pulse is being generated. This is in contrast to the use of clock pulses CP for storing of signals from other circuits in the digital data processor 10. The timing generator 79 develops output pulses which control the read and write drivers 77 and 78 and cause them to deliver read and write current pulses, respectively, on the line 67.

Refer now to FIG. 8. FIG. 8 shows the sequence with which the timing generator 79 develops pulses during each read and write cycle. A read and write cycle is initiated by a clock pulse during all program steps. As indicated in FIG. 8, during a read-write cycle a read pulse (RP) is first applied to the line 67 to the address switches 50 and 54. This causes current to flow through the switches therein, which are turned on, through the lines to the addressing switches 52 and 56, respectively. The switch turned on in the isolated switches 52 and 56 allows the read current to flow to ground through only one of the lines in the rows and columns. A strobe pulse is developed by the timing generator 79 at about the end of the read pulse. The strobe pulse causes the C register 36 to store the character of signals read out of cores in the storage means 16 during the read pulse, whenever a high potential is developed by the "or" gating circuit 63. Referring to the flow diagram of FIG. 9, reading and storing in the C register 36 occurs only during program steps 1, 2, 3, 5*a*, 5*b*, 5*c*, 6 and 9. Following the strobe pulse, a write pulse is generated by the timing generator 79. The write pulse causes the write driver 78 to deliver write current on the line 67 through the addressing switches 52 and 56 through a single line in the rows and a single line in the columns to the switches turned on in the addressing switches 50 and 54, respectively.

Since core units have a destructive read-out, that is, the magnetic storage state of the core is destroyed during a read cycle, this state must be restored by writing back any signal read out of the storage means 16. This is accomplished since following each read pulse is a write pulse, causing the character read out of the storage means 16 and stored in the C register 36 to be written back.

It will also be noted that since the C register flip-flops each have single-ended inputs from the storage means 16, therefore, the flip-flops must be cleared or reset following each read and write cycle. This is done by each clock pulse except during program steps 9 and 10 when the output signals of the processing unit 12 and the program card reader 22 are stored in the C register 36 and are to be written during the following program step or read-write cycle.

A core and memory drive system, such as that described above is disclosed in a pending patent application assigned to the same assignee as this patent application, entitled "Core Memory Drive Circuitry" by Joseph Reese Brown Jr., and having the Serial No. 58,240 and filed on Sept. 26, 1960.

The driver control circuit 70 is shown in detail in FIG. 3 and has an "or" type gating circuit 80 connected to each of the eight control lines 66 of the addressing switches 50. The "or" type gating circuit 80 has one group of eight input lines connected to the output circuit of gating circuit 81. The gating circuit 81 has eight input lines connected to the output circuit of a decoding circuit 85 and a separate control circuit connected to the MARL line 88. The decoding circuit 85 is connected to the output circuits of the #1 and #2 flip-flops of the hundreds section 42*d* of the memory address register 42 and the #1 flip-flop of the units section 42*b* of the memory address register 42. Also, the decoder circuit 85 is connected to the IL line 91.

Similar to the gating circuit 81 and the decoding circuit 88 combination, a gating circuit 82 and a decoding circuit 86 combination, and a gating circuit 83 and a decoding circuit 87 combination are provided in the driver control circuit 70. The decoding circuit 86 is connected to the #1 and #2 flip-flops of the hundreds section 32*d* and the #1 flip-flop of the units section 32*b* of the command address register 32. The gating circuit 82 is connected to the CARL line 89, rather than the MARL line 88. The decoding circuit 87 is connected to the buffer selector 40 and the #1 flip-flop of the units section 44*b* of the buffer address register 44. The gating circuit 83 is connected to the BAPL line 90, rather than the MARL line 88. It should be noted, however, that the decoder circuits 86 and 87 are not connected to the IL line 91, as is the decoder circuit 85.

Similar to the driver control circuit 70 for the addressing switches 50, driver control circuits 72, 74 and 76 are provided for controlling the addressing switches 52, 54 and 56, respectively. These driver control circuits are similar to the driver control circuit 70 except that the decoding circuit and gating circuit of the driver control circuits 72 and 76 are arranged for decoding and gating, four flip-flops to control the addressing switches 52 and 56, rather than three, and the driver control circuit 72 does not have a decoder circuit corresponding to decoder circuit 87 and a gating circuit corresponding to gating circuit 83. Another difference is that the decoding and gating circuits of the driver control circuits 72, 74 and 76 are arranged for controlling ten, five and twelve switch circuits respectively, rather than eight. One other distinction is that the IL line 91 is connected through an "or" type gating circuit 92 and then to the decoder circuit corresponding to decoder circuit 85 rather than directly, as in the driver control circuit 70. The "or" gating circuit 92 has another input circuit connected to the P11 output circuit of the sequence control circuit 100.

The decoder circuit 85 in the driver control circuits 72, 74 and 76 are connected to all of the tens section 42*c*, the #2, #4 and #8 flip-flops of the units section 42*b* and all of the section 42*a* of the memory address register 42. The decoding circuit 86 in the core driver control circuits 72, 74 and 76 are connected to all of the tens section 32*c*, the #2, #4 and #8 flip-flops of the units section 32*b* and all of the section 32*a* of the command address register 32, respectively. Also, the decoding circuits 87 in the driver control circuits 74 and 76 are connected to the #2, #4 and #8 flip-flops of the tens section 44*b* and all of the units sction 44*a* of the buffer address register 44.

The gating circuits, corresponding to gating circuit 81, in the driver control circuits 72, 74 and 76 are also connected to the MARL line 88. Also, the gating circuits, corresponding to gating circuit 82, in the driver control circuits 72, 74 and 76 are all connected to the CARL line 89, and the gating circuits, corresponding to gating circuit 83, in the driver control circuits 74 and 76 are connected to the BAPL line 90.

It should be understood that the storage means 16, as described to this point, encompasses only the main memory unit 16*a*. With the core driving arrangement of FIG. 3, a single isolated buffer switch 53, with eight output wires, identical to the isolated switches in the addressing switches 52, is added to this arrangement, with the line 67 connected to the write driver 78. When separately connected to the #11 lines in each of the row groups, eight new buffer rows or sections are added to the storage means 16. Thus, the number of buffer sections which may be added to the storage means 16 by the addition of a single buffer switching circuit 53 is equal to the number of row groups, or the number of current switching circuits in the addressing switches 50. The control circuit of the buffer switch 53 is connected to an "or" gating circuit 93. The "or" gating circuit 93 has three input circuits connected to the IL line 91, the BAPL line 90 and the P11 output circuit of the reader access counter 103.

Since there are a total of sixty columns of core units 48 and associated conductors, it requires one row or buffer section and part of a second row or buffer section to form a single buffer unit to total up to the desired eighty storage locations in a buffer. The buffer unit 16*b* comprises the buffer sections in row groups #1 and #2 for this capacity of storage. As illustrated by FIG. 3 the hundreds section 42*d* and the #1 flip-flop of the units section 42*b* of the memory address register 42 select a buffer by means of the decoder 85, gates 81 and 80 and the address switches 50. The state of the hundreds section 42*d* caused by the signal at line 117 (see FIG. 2) selects two of address switches 50 and as a result two of the row groups #1 through #8 are selected. The signal stored in the #1 flip-flop of the units section 42*b* causes one of the two selected address switches and as a result one of the row groups to be singled out and selected.

Refer now to FIG. 2. The C register 36 is also connected to the output circuit of the program card reader 22 and the P9 and P10 output circuits of the buffer access counter 103. Gating circuits (not shown) are also provided in the C register 36 and are synchronized to clock pulses (CP) rather than the strobe pulse (SP), so that when a clock pulse is developed and a high potential signal developed at the output circuit P10 during program step 10, a store signal is provided to the C register 36 causing the character of binary signals at the output of the program card reader 22 to be read and stored in the flip-flop circuits C1 through C7 of the C register 36. The C register 36 also contains gating circuits (not shown) for causing the C register 36 to store the output signals of the processing unit 12 during program step 9 when a high potential signal is developed at the P9 output circuit of the command sequence ring counter 102 and at the occurrence of a clock pulse.

With the details of the storage means 16 and its associated core addressing circuits in mind, consider the operation of the storage system of FIG. 3. In the following discussion, reference should be made to the flow diagram of FIGS. 9A and 9B. At the bottom of each program step box, except step 8, one or more of the symbols MARL, CARL, BAPL and IL appear. This indicates which of the lines MARL line 88, CARL line 89, BAPL line 90 and IL line 91 a signal is developed on and indicates which of the registers is being used to address the storage means 16.

During the program steps 1, 2, 3, 5*a*, 5*b* and 5*c*, high potential signals are developed on the CARL line 89. This causes the gating circuits 82 to connect the outputs of the decoders 86 to the corresponding core drivers. Thus, the command address register 32 is used to address the storage means 16. Also, during the program steps 1, 2, 3, 5*a*, 5*b* and 5*c* the read driver 77 develops a read current on the line 67 to the addressing switches 50 and 54 and characters of the transfer to memory command are read out of storage locations addressed by the command address register 32.

During program steps 7, 9, 10 and 11, high potential signals are developed on the MARL line 88. During the program step 7, all of the flip-flops of the memory address register 42 are used to address the main memory portion 16*a* of the storage means 16. Also, during program step 7 the write driver 78 develops write current on the line 67 to the addressing switches 52 and 56, which causes a character stored in the C register 36 to be written into the storage location addressed by the memory address register 42.

During program steps 9 and 10, a high potential signal is developed on the IL line 91. The inhibit level signal has a different effect on the decoder circuits 85 in each of the driver control circuits 70, 72, 74 and 76. The purpose of the signal on the IL line 91 is to cause the next buffer address 16B to be addressed by the memory address register. An inhibit signal on the IL line 91 causes the decoder circuit 85 in the driver control circuit 70 to block the signals from #1 flip-flop of the units section 42*b*, making the output signals of the decoder circuit 85 appear as though this flip-flop were false, regardless of its state. Similarly, the inhibit level on the IL line 91 causes the decoder circuit 85 in the driver control circuit 74, which corresponds to the decoder circuit 85 of driver control circuit 70, to block the signals from the #4 and #2 flip-flops of the units sections 42*b*, causing the addressing switches 54 to be controlled as though the #2 and #4 flip-flops were false, regardless of their states. The inhibit level signals blocks any output signal from the decoder circuit in the driver control circuit 72, which corresponds to the decoder circuit 85 of the driver control circuit 70, preventing any of the isolated current switching circuits in the addressing switches 52 from being turned on. The inhibit level signal causes the decoding circuit 85 in the driver control circuit 76, which corresponds to the decoding circuit 85 of the driver control circuit 70, to address the switches in the addressing switches 56 as though all flip-flops in the units section 42*a* of the memory address register 42 were false. Thus, during program steps 9 and 10, the IL line is at a high potential and the "or" gating circuit 93 turns the buffer current switching circuit 53 on and the the flip-flops of the hundreds section 42d and the #8 flip-flop (U8) of the units section 42*b* of the memory address register 42 are used to select the buffer unit 16*b* and the next buffer address storage location 16B. During program steps 9 and 10, the write driver develops write current on the line 67 to the addressing switches 52 and 56, causing the next buffer address to be read out of the next buffer address storage location 16B and, after being incremented written back into the next buffer address storage location 16B.

During the program step 11, a high potential signal is developed on the MARL line 88. Also, the P11 output of the command sequence ring counter 102 causes an inhibit signal to be developed by the "or" gating circuit 92 to the decoder circuit 85 in the driver control circuit 72 which prevents any control signals from being applied to the switches in the addressing switches 52. However, the "or" gating circuit 93 turns the buffer current switching circuit 53 on. At the same time, write current is developed on the line 67 by the write driver 78 and the character stored in the C register 36 is written in the storage location of the buffer unit 16*b* specified by the address stored in the hundreds section 42*d*, the units section 42*b* and the character section 42*a* of the memory address register 42.

During the program steps 4 and 6, a high potential signal is developed on the BAPL line 90. This causes the buffer current switching circuit 53 to be turned on and the memory address register 44 and the buffer selector 40 to be used for addressing the buffer units in the storage means 16. During program step 4, a write signal, developed by the write driver 78, causes the initial buffer address character (0) stored in the C register 36 to be written in the buffer unit 16*b*.

What is claimed is:

1. In a system the combination of which comprises:

(a) input means for providing a series of digital signals a character at a time;

(b) an addressable memory unit including buffer storage locations for storing the characters from the input means and including a predetermined storage location for storing the address of a buffer storage location in which a character from the input means is to be stored;

(c) means adapted for selectively reading the buffer address out of the predetermined storage location of the memory unit when a character from the input means is to be stored;

(d) register means for storing the buffer address read out of the predetermined storage location;

(e) memory address register means for storing the buffer address stored in the register means;

(f) means comprising adding means connected for modifying the buffer address stored in the register means and for forming the address of the next sequentially addressable buffer storage location in which an input character is to be written, said register means further being arranged for storing the modified buffer address;

(g) means for writing the modified buffer address stored in the register means back into the predetermined storage location of the memory unit, said register means additionally being arranged for storing an input character provided by the input means; and (h) means for writing the input character stored in the register means into the buffer storage location specified by the buffer address stored in the memory address register means.

2. In a system the combination of which comprises:

(a) at least one input means for providing a series of digital signals a character at a time;

(b) an addressable memory unit having storage locations for storing input characters from the input means in sequence including a predetermined storage location corresponding to the input means, the predetermined storage location containing the address of a storage location into which a character from the input means is to be stored temporarily until transferred to another part of the memory unit, the memory unit thereby forming a buffer unit as an integral part thereof;

(c) addressing means arranged for selectively forming the address of the predetermined storage location corresponding to the input means providing a character for storage in the memory unit;

(d) means for reading out of memory unit the address which is contained in the predetermined storage location identified by the address formed by the addressing means;

(e) register means for storing the address read out of the predetermined storage location;

(f) memory address register means for storing the address stored in the register means;

(g) means comprising adder means for modifying the address stored in the register means and for forming a modified address of the next subsequent storage location following the address into which a character from the input means is to be stored, said register means further being arranged for storing the modified address;

(h) means for writing the modified address into the predetermined storage location identified by the address formed by the addressing means, said register means further being arranged for storing the character provided by the input means which is to be stored in the memory unit; and (i) means for writing the input character stored in the register means into the storage location of the memory means specified by the address contained in the memory address register means.

3. In a system the combination of which comprises:

(a) input means for providing a series of digital signals a character at a time;

(b) an addressable memory unit including sequentially addressable buffer storage locations for storing the characters from the input means and including a predetermined storage location for storing the address of a buffer storage location in which a character from the input means is to be stored;

(c) means for selectively reading the buffer address out of the predetermined storage location of the buffer storage section as a character is provided by the input means to be stored in the memory unit;

(d) register means for storing the buffer address read out of the predetermined storage location;

(e) memory address register means for storing the buffer address stored in the register means;

(f) means comprising adding means connected for modifying the buffer address stored in the register means by one memory location and for forming a modified buffer address corresponding to the next buffer storage location into which an input character is to be stored, said register means further being arranged for storing the modified buffer address;

(g) means for writing the modified buffer address stored in the register means back into the predetermined storage location of the memory unit, said register means additionally being arranged for storing an input character provided by the input means which is to be stored in the memory unit; and (h) means for writing the input character stored in the register means into the buffer storage location specified by the buffer address contained in the memory address register means.

4. In a system the combination of which comprises:

(a) a plurality of input means each for providing a series of digital signals a character thereof at a time;

(b) an addressable memory unit having a group of buffer storage locations corresponding to each input means for storing input characters provided by the input means, and including a predetermined storage location corresponding to each input means containing a buffer address for the corresponding group of buffer storage locations into which an input charatcer is to be stored;

(c) buffer designating means arranged for storing a signal identifying the group of buffer storage locations and the predetermined storage location corresponding to an input means providing an input character to be stored;

(d) means for selectively reading the buffer address out of the predetermined storage location identified by the contents of the buffer designating means;

(e) register means for storing the buffer address read out of the predetermined storage location;

(f) memory address register means for storing the buffer address stored in the register means;

(g) means comprising adding means for modifying the buffer address stored in the rgeister means and for forming a modified buffer address corresponding to the next buffer storage location into which a character is to be stored in the corresponding group of buffer storage locations, said register means further being arranged for storing the modified buffer address;

(h) means for writing the modified buffer address stored in the register means into the predetermined buffer storage location identified by the contents of the designating means, said register means additionally being arranged for storing the input character provided by the input means which is to be stored into the memory unit; and (i) means for writing the input character stored in the register means into the buffer storage location of the memory unit identified by the contents of the memory address register means and the buffer designating means.

5. In a system the combination of which comprises:

(a) a plurality of input means each for providing a series of digital signals a character thereof at a time;

(b) addressable memory means having a group of buffer storage locations corresponding to each input means for storing input characters in sequence as provided by the input means and including a predetermined storage location corresponding to each input means containing a buffer address for the corresponding group of buffer storage locations into which an input character is to be stored;

(c) buffer designating means arranged for storing a signal identifying the group of buffer storage locations and the predetermined storage location corresponding to an input means providing an input character to be stored;

(d) means for selectively storing a signal which together with the contents of the buffer designating means identifies the predetermined storage location corresponding to the input means providing an input character which is to be stored;

(e) means for selectively reading the buffer address out of the predetermined storage location identified by the contents of the buffer designating means and the predetermined storage location identifying means;

(f) means for storing the buffer address read out of the memory means;

(g) means for modifying the buffer address read out of the memory means and for forming a modified address corresponding to the next buffer storage location in the same group into which a character is to be stored;

(h) means for writing the modified buffer address into the predetermined buffer storage location identified by the contents of the designating means and the predetermined storage location identifying means; and (i) means for writing the input character stored in by the input means which corresponds to the contents of the designating means into the buffer storage location identified by the contents of the buffer address storing means and the buffer designating means.

6. In a digital computer system the combination of which comprises:

(a) a plurality of input means each for providing a series of digital signals a character thereof at a time;

(b) addressable memory means having a group of buffer storage locations corresponding to each input means for storing input characters provided by the input means and including a predetermined storage location corresponding to each input means for storing a buffer address for the corresponding group of buffer storage locations into which an input character is to be stored;

(c) buffer designating means arranged for storing a signal identifying the group of buffer storage location tions and the predetermined storage location corresponding to an input means providing an input character which is to be stored;

(d) means for selectively storing a signal which together with the contents of the buffer designating means identifies the predetermined storage location corresponding to the input means providing an input character which is to be stored;

(e) means for selectively reading the buffer address out of the predetermined storage location identified by the content of the buffer designating means and the predetermined storage location identifying means;

(f) register means for storing the buffer address read out of the predetermined storage location;

(g) address storing means for storing the buffer address stored in the register means;

(h) means for modifying the buffer address stored in the register means and for forming a modified address corresponding to the next buffer storage location in the same group into which a character is to be stored, said register means further being arranged for storing the modified buffer address;

(i) means for writing the modified buffer address stored in the register means into the predetermined buffer storage location identified by the content of the designating means and the predetermined storage location identifying means, said register means additionally being arranged for storing the input character provided by the input means corresponding to the content of the designating means; and (j) means for writing the input character stored in the register means into the buffer storage location identified by the content of the address storing means and the buffer designating means.

7. In a system the combination of which comprises:

(a) a plurality of input means each for providing a series of digital signals a character thereof at a time;

(b) an addressable memory unit having a group of buffer storage locations corresponding to each input means for storing input characters in sequence as provided by the input means and including a predetermined storage location corresponding to each input means for storing a buffer address for the corresponding group of buffer storage locations into which an input character is to be stored;

(c) buffer designating means arranged for storing a signal identifying the group of buffer storage locations and the predetermined storage location corresponding to an input means providing an input character to be stored;

(d) means for storing a signal which together with the contents of the buffer designating means identifies the predetermined storage location corresponding to the input means providing an input character which is to be stored;

(e) means for selectively reading the buffer address out of the predetermined storage location identified by the content of the buffer designating means and the predetermined storage location identifying means;

(f) register means for storing the buffer address read out of the predetermined storage location;

(g) address storing means for storing the buffer address stored in the register means;

(h) means comprising adding means for modifying the buffer address stored in the register means by one address and for forming a modified address corresponding to the next buffer storage location in the same group into which a character is to be stored said register means further being arranged for storing the modified buffer address;

(i) means for writing the modified buffer address stored in the register means into the predetermined buffer storage location identified by the content of the designating means and the predetermined storage location identifying means, said register means additionally being arranged for storing the input character provided by the input means corresponding to the content of the designating means; and (j) means for writing the input character stored in the register means into the buffer storage location identified by the content of the address storing means and the buffer designating means.

8. In a stored program digital computer for processing characters of data and arranged for interrupting the processing operation at predetermined intervals during the processing of the data for storing input characters into a memory of the digital computer comprising:

(a) addressable memory means having storage locations for storing input characters and including a plurality of groups of buffer storage locations for storing input characters temporarily until being transferred to another working portion of the memory means and including at least one predetermined storage location corresponding to each buffer group containing an address of a storage location in the corresponding buffer group for storing an input character, said memory means containing a stored program including at least one command for controlling the transfer of characters from said buffer groups into another working portion of the memory means, each transfer command including a portion designating the buffer group from which characters are to be transferred, and the address of the beginning of a memory field wherein the characters contained in the corresponding buffer group are to be stored;

(b) means for selectively reading the address out of one of the predetermined storage locations concurrently with the interruption of processing by the digital computer;

(c) means responsive to the address read out of the memory means for storing a signal identifying the next storage location in which a character is to be written and for forming an address for storage back into the predetermined storage location of the memory means;

(d) means for writing the address formed by the last mentioned means into the predetermined storage location from which the address read out of the memory means was read;

(e) means for writing an input character provided thereto into the storage location identified by content of the storing means;

(f) means for reading out of the memory means said at least one transfer command;

(g) means for storing the buffer designation portion of the instruction read out of the memory means;

(h) counting means arranged for providing an indication of the address of the first storage location in a buffer group from which a character is to be read;

(i) means for modifying the address in the command read out of the memory means and for forming a modified address corresponding to the first storage location into which a character is to be transferred from the corresponding buffer group;

(j) address counting means for storing the modified address formed by the last mentioned means;

(k) means for reading out of the memory means the character stored in the storage location of the buffer group specified by the content of the buffer designating means and the content of the counting means;

(l) register means for storing the character read out of the memory means;

(m) means for writing the character stored in the register means into the storage location specified by the content of the address counting means;

(n) control means for activating the address counting means and the counting means and thereby cause the same to count and form the address of the next storage location for the same buffer group from which a character is to be read and into which a character is to be written in the memory means; and (o) means for reactivating the character reading and writing means and the control means until each of the characters stored in the buffer group are transferred to a working portion of the memory means.

9. In a stored program digital computer for processing characters of data and arranged for interrupting the processing operation at predetermined intervals during the processing of the data for storing input characters into a memory of the digital computer, comprising:

(a) addressable memory means having storage locations for storing input characters and including a plurality of groups of buffer storage locations for storing input characters temporarily until being transferred to another working portion of the memory means and including at least one predetermined storage location for each buffer group containing an address of a storage location in the corresponding buffer group for storing an input character, said memory means containing a stored program including at least one command for controlling the transfer of characters from said buffer groups into another working portion of the memory means, each transfer command including a portion designating the buffer group from which characters are to be transferred, and the address of the beginning of a memory field wherein the characters contained in the corresponding buffer group are to be stored;

(b) means for selectively reading the address out of one of the predetermined storage locations concurrently with the interruption of processing by the digital computer;

(c) means responsive to the address read out of the memory means for storing a signal identifying the next storage location in which a character is to be written and for forming an address for storage back into the predetermined storage location of the memory means;

(d) means for writing the address formed by the last mentioned means into the predetermined storage location from which the address read out of the memory means was read;

(e) means for writing an input character provided thereto into the storage location identified by content of the storing means;

(f) means for reading out of the memory means said at least one transfer command;

(g) means for storing the buffer designation portion of the instruction read out of the memory means;

(h) counting means arranged for providing an indication of the address of the first storage location in a buffer group from which a character is to be read;

(i) means for combining the address in the command read out of the memory means with the content of the counting means and for forming a modified address corresponding to the first storage location into which a character is to be transferred from the corresponding buffer group;

(j) address counting means for storing the modified address formed by the last mentioned means;

(k) means for reading out of the memory means the character stored in the storage location of the buffer group specified by the content of the buffer designating means and the content of the counting means;

(l) register means for storing the character read out of the memory means;

(m) means for writing the character stored in the register means into the storage location specified by the content of the address counting means;

(n) control means for activating the address counting means and the counting means and thereby cause the same to count and form the address of the next storage location for the same buffer section from which a character is to be read and into which a character is to be written in the memory means; and (o) means for re-activating the character reading and writing means and the control means until each of the characters stored in the buffer section are transferred to a working portion of the memory means.

10. In a system having input means for serially providing characters for storage, the combination of which comprises:

(a) addressable memory means including a plurality of buffers each having sequentially addressable storage locations for storing the characters provided by an input means and including at least one predetermined storage location for storing a character comprising a partial address designating the storage location within the corresponding buffer for storing a character from an input means;

(b) means for reading the partial address out of the predetermined storage location of a buffer;

(c) addressing means comprising bistable circuit means adapted for storing a signal designating a plurality of said buffers and register means arranged in conjunction with said bistable circuit means for storing a signal designating a single buffer, said addressing means additionally being adapted for storing a signal corresponding to said partial address so that a signal designating the complete address of a buffer storage location in such single buffer is contained in the addressing means;

(d) means for modifying the partial address read out of the memory means and for forming a modified partial address corresponding to the next sequential address in the designated buffer into which a character from the input means is to be stored;

(e) means for writing the modified partial address back into the same predetermined storage location from which the partial address was read; and (f) means for writing the character provided by an input means into the storage location of such single buffer designated by the addressing means.

11. In a system the combination of which comprises:

(a) input means for serially providing characters for storage;
(b) addressable memory means including a buffer having sequentially addressable storage locations for storing the characters provided by the input means and including at least one predetermined storage location for storing a character comprising a partial address designating the storage location within the buffer for storing a character from the input means;
(c) means for reading the partial address out of the predetermined storage location;
(d) addressing means comprising register means adapted for storing a signal designating a plurality of said buffer storage locations, said addressing register means additionally being adapted for storing said partial address so that a signal designating the complete address of a buffer storage location is contained therein;
(e) means for modifying the partial address read out of the memory means by one address and for forming a modified partial address corresponding to the next sequential buffer storage location into which a character from the input means is to be stored;
(f) means for writing the modified partial address back into the predetermined storage location; and
(g) means for writing the character provided by the input means into the buffer storage location designated by the addressing means.

12. In a system having input means for serially providing characters for storage, the combination of which comprises:
(a) addressable memory means including a buffer having sequentially addressable storage locations for storing a series of characters provided by an input means and including at least one predetermined storage location for storing a character comprising a partial address designating the storage location within the buffer for storing a character from such input means;
(b) means for reading the partial address out of the predetermined storage location;
(c) addressing means comprising register means adapted for storing a signal designating a plurality of said buffer storage locations, said addressing register means additionally being adapted for storing a signal corresponding to said partial address so that a signal designating the complete address of a buffer storage location is contained therein;
(d) means for modifying the partial address read out of the memory means and for forming a modified partial address corresponding to the next sequential address in the buffer into which a character from such input means is to be stored;
(e) means for writing the modified partial address back into the predetermined storage location; and
(f) means for writing the character provided by the input means into the buffer storage location designated by the addressing means.

13. In a system having input means for providing a series of digital signals a character at a time, the combination of which comprises:
(a) an addressable memory unit including a plurality of buffers each having storage locations for storing the characters from the input means and including a predetermined storage location for storing a partial address of a location within the corresponding buffer in which a character from an input means is to be stored;
(b) means adapted for selectively reading the partial buffer address out of the predetermined storage location of a buffer in the memory means when a character from such input means is to be stored;
(c) register means for storing the partial address read out of the predetermined storage location;
(d) memory addressing means including bistable circuit means for storing a signal designating said plurality of buffers in the memory and register means adapted in conjunction with the bistable circuit means for storing a signal designating a single buffer of storage locations within the memory unit, said addressing means additionally comprising means adapted for storing the partial buffer address stored in the register means and thereby cause the addressing means to contain a signal designating a complete address of a single buffer storage location for storing an input character;
(e) means connected for modifying the partial buffer address stored in the register means and for forming a partial address of the next sequentially addressable storage location in which an input character is to be written in the corresponding buffer, said register means further being arranged for storing the modified partial buffer address;
(f) means for writing the modified partial buffer address stored in the register means back into the same predetermined storage location of the memory unit from which the partial address was read, said register means additionally being adapted for storing an input character provided by such input means; and
(g) means for writing the input character stored in the register means into the buffer storage location designated by the content of the addressing means.

14. In a system having input means for providing a series of digital signals a character at a time, the combination of which comprises:
(a) an addressable memory unit including a buffer containing a plurality of storage locations for storing the characters from the input means and including a predetermined storage location for storing a partial address of a location within the buffer locations in which a character from an input means is to be stored;
(b) means adapted for selectively reading the partial buffer address out of the predetermined storage location of the memory unit when a character from such input means is to be stored;
(c) register means for storing the partial buffer address read out of the predetermined storage location;
(d) memory addressing means including register means for storing a signal designating a plurality of buffer storage locations, said memory addressing register means additionally being adapted for storing the partial buffer address stored in the register means and thereby cause the addressing means to contain a signal designating a complete address of a single buffer storage location for storing an input character;
(e) means connected for modifying the partial buffer address stored in the register means and for forming a partial address of the next sequentially addressable storage location in which an input character is to be written in the buffer, said register means further being arranged for storing the modified partial buffer address;
(f) means for writing the modified partial buffer address stored in the register means back into the predetermined storage location of the memory unit, said register means additionally being arranged for storing an input character provided by such input means; and
(g) means for writing the input character stored in the register means into the buffer storage location specified by the content of the addressing means.

15. In a digital computer system, the combination of which comprises:
(a) means for serially providing characters, for storage, said input means being adapted for forming a signal for each character indicating a character is being provided;
(b) a digital computer for processing characters of data, character by character, including a memory system adapted for reading and writing information, character by character, said computer being adapted for interrupting processing therein at preselected points in the processing operation in response to the presence of the signal from said input means, the memory system comprising;

(1) an addressable memory unit including a buffer therein having sequentially addresable storage locations for storing a series of characters provided by an input means and including at least one predetermined storage location for storing a character comprising a partial address designating the storage location within the buffer for storing a character from such input means;

(2) means for reading the partial address out of the predetermined storage location;

(3) addressing means comprising register means adapted for storing a signal designating a plurality of said buffer storage locations, said addressing register means additionally being adapted for storing a signal corresponding to the partial address read out of the memory mean so that a signal designating the complete address of a buffer storage location is contained therein;

(4) means for modifying the partial address read out of the memory means and for forming a modified partial address corresponding to the next sequential address in the buffer into which a character from such input means is to be stored;

(5) means for writing the modified partial address back into the predetermined storage location; and (6) means for writing the character provided by the input means into the buffer storage location designated by the addressing means.

16. In a digital computer system, the combination of which comprises:

(a) means for serially providing characters, for storage, said input means being adapted for forming a signal for each character indicating a character is being provided;

(b) a digital computer for processing character of data, character by character, including a memory system adapted for reading and writing information, character by character, said computer being adapted for interrupting processing therein at preselected points in the processing operation in response to the presence of the signal from said input means, the memory system comprising:

(1) an addressable memory unit including a plurality of buffers therein having sequentially addressable storage locations for storing the characters provided by an input means and including at least one predetermined storage location for storing a character comprising a partial address designating the storage location within the corresponding buffer for storing a character from an input means;

(2) means for reading the partial address out of the predetermined storage location of a buffer;

(3) addressing means comprising bistable circuit means adapted for storing a signal designating a plurality of said buffers and register means arranged in conjunction with said bistable circuit means for storing a signal designating a single buffer, said addressing means additionally being adapted for storing a signal corresponding to the partial address read out of said memory unit so that a signal designating the complete address of a buffer storage location in such single buffer is contained in the addressing means;

(4) means for modifying the partial address read out of the buffer and for forming the partial address of the next sequential storage location in such buffer into which a character from such input means is to be stored;

(5) means for writing the modified partial address back into the same predetermined storage location from which the partial address was read; and (6) means for writing the character provided by an input means into the storage location of such single buffer designated by the addressing means.

17. In a system having input means for serially providing characters for storage, the combination of which comprises:

(a) an addressable memory unit including a buffer as an integral part thereof, said buffer having sequentially addressable storage locations for storing a series of characters provided by an input means and including at least one predetermined storage location for storing a character comprising a partial address designating the storage location within the buffer for storing a character from such input means;

(b) memory unit addressing means for forming an address designating the predetermined storage location of said buffer;

(c) means for reading out the partial address contained in the predetermined storage location designated by said addressing means, said memory unit addressing means additionally comprising register means for storing a signal corresponding to the partial address read out of said predetermined storage location and for forming a complete address of a buffer storage location for storing a character;

(d) means for modifying the partial address read out of said predetermined storage location and for forming a modified partial address corresponding to the next sequential address in the buffer into which a character from such input means is to be stored;

(e) means for writing the modified partial address back into the predetermined storage location designated by the addressing means; and (f) means for writing the character provided by the input means into the buffer storage location designated by the addressing means.

18. In a digital data system having peripheral means the combination of which comprises:

(a) an addressable memory unit including a buffer as an integral part thereof, said buffer having sequentially addressable storage locations for storing a series of data signals transferred therebetween and an input means and including at least one predetermined storage location for storing an address designating a storage location within the buffer;

(b) memory unit addressing means for forming an address designating the predetermined storage location of said buffer;

(c) means for reading out the address contained in the predetermined storage location designated by said addressing means, said memory unit addressing means additionally comprising register means for storing a signal corresponding to the address read out of said predetermined storage location and for forming the address of the corresponding buffer storage location;

(d) means for modifying the address read out of said predetermined storage location and for forming a modified address corresponding to the next sequential address in the buffer between which a character is to be transferred;

(e) means for writing the modified address back into the predetermined storage location designated by the addressing means; and (f) means for transferring a data signal between the buffer storage location designated by the addressing means and such input means.

(References on following page)

References Cited by the Examiner

UNITED STATES PATENTS

| | | | |
|---|---|---|---|
| 2,882,517 | 4/1959 | Warren | 340—174 |
| 2,920,315 | 1/1960 | Markowitz et al. | 340—174 |
| 2,968,027 | 1/1961 | McDonnell et al. | 340—172.5 |
| 3,008,127 | 11/1961 | Bloch et al. | 340—172.5 |
| 3,010,094 | 11/1961 | MacArthur | 340—172.5 |
| 3,010,095 | 11/1961 | Dirks | 340—172.5 |
| 3,013,250 | 12/1961 | Maley | 340—172.5 |
| 3,029,414 | 4/1962 | Schrimpf | 340—172.5 |
| 3,061,192 | 10/1962 | Terzian | 235—157 |
| 3,111,648 | 11/1963 | Marsh et al. | 340—172.5 |

MALCOLM A. MORRISON, *Primary Examiner.*

IRVING L. SRAGOW, *Examiner.*